United States Patent [19]

Shiga et al.

[11] Patent Number: 5,749,228
[45] Date of Patent: May 12, 1998

[54] STEAM-TURBINE POWER PLANT AND STEAM TURBINE

[75] Inventors: Masao Shiga, Hitachi; Ryo Hiraga, Hitachiota; Takeshi Onoda; Nobuo Shimizu, both of Hitachi; Norio Yamada, Hitachiota; Mitsuo Kuriyama, Ibaraki-ken; Kishio Hidaka, Hitachi; Shigeyoshi Nakamura, Katsuta; Yutaka Fukui, Hitachi; Toshio Fujita, Tokyo, all of Japan

[73] Assignee: Hitachi, Ltd., Tokyo, Japan

[21] Appl. No.: 453,556

[22] Filed: May 30, 1995

Related U.S. Application Data

[63] Continuation of Ser. No. 391,945, Feb. 21, 1995.

[30] Foreign Application Priority Data

Feb. 22, 1994 [JP] Japan .................... 6-023962

[51] Int. Cl.⁶ .................... F01K 7/22; B63H 1/26
[52] U.S. Cl. .................... 60/679; 416/241 R; 415/216.1; 148/325; 420/109
[58] Field of Search .................... 60/679; 416/241 R; 415/200, 216.1; 148/325, 333, 904; 420/38, 107, 109

[56] References Cited

U.S. PATENT DOCUMENTS

| | | | |
|---|---|---|---|
| 2,955,429 | 10/1960 | Miller | 60/679 |
| 3,880,549 | 4/1975 | Schrieken | 415/95 |
| 3,928,977 | 12/1975 | Braytenbah et al. | 60/679 X |
| 3,990,243 | 11/1976 | Davoud | 60/679 X |
| 4,328,675 | 5/1982 | Pocrnja et al. | 60/679 X |
| 4,598,551 | 7/1986 | Dimitrof, Jr. et al. | 60/679 X |
| 4,920,751 | 5/1990 | Gounder et al. | 60/679 |
| 5,383,768 | 1/1995 | Siga et al. | 416/241 |
| 5,536,146 | 7/1996 | Siga et al. | 416/241 |

FOREIGN PATENT DOCUMENTS

| | | |
|---|---|---|
| 0 129 167 A2 | 12/1984 | European Pat. Off. . |
| 0 298 127 A1 | 1/1989 | European Pat. Off. . |
| 0 384 181 A2 | 8/1990 | European Pat. Off. . |
| 0 384 433 A1 | 8/1990 | European Pat. Off. . |
| 0 523 466 A1 | 1/1993 | European Pat. Off. . |
| 0 639 691 A1 | 2/1995 | European Pat. Off. . |
| 383253 | 10/1923 | Germany . |
| 407717 | 1/1925 | Germany . |
| 61-23749 | 2/1986 | Japan . |
| 62-180044 | 8/1987 | Japan . |
| 62-248806 | 10/1987 | Japan . |
| 2-290950 | 11/1990 | Japan . |
| 4-147948 | 5/1992 | Japan . |
| 4-371551 | 12/1992 | Japan . |
| 7233704 | 5/1995 | Japan . |
| 2 096 713 | 3/1982 | United Kingdom . |
| WO 93/13298 | 7/1993 | WIPO . |

*Primary Examiner*—Hoang Nguyen
*Attorney, Agent, or Firm*—Pennie & Edmonds LLP

[57] ABSTRACT

A steam turbine in which principal components to be exposed to high temperatures are all made of ferritic steel, whereby the temperatures of main steam and reheat steam can be increased to 610–660 (°C.). The rotor shaft (23 in FIG. 1) of the steam turbine is made of ferritic forged steel whose 100,000-hour creep rupture strength is at least 15 (kg/mm²) at the service temperature of the rotor shaft. Likewise, the casing (18) is made of ferritic cast steel whose 100,000-hour creep rupture strength is at least 10 (kg/mm²). The steam turbine of high thermal efficiency can be applied to a steam-turbine power plant.

16 Claims, 20 Drawing Sheets

FIG. 12

TABLE 1

| PLANT OUTPUT | 1050MW |
|---|---|
| OPERATING METHOD | CONSTANT-PRESSURE TYPE |

| BOILER SPECIFICATIONS | TYPE | RADIATION-REHEATING TYPE ONCE-THROUGH BOILER OF ULTRA-SUPERCRITICAL PRESSURE |
|---|---|---|
| | EVAPORATION RATE | 3170t/h |
| | STEAM PRESSURE | 24.12MPa[G] |
| | STEAM TEMPERATURE | 630°C/630°C |
| PERFORMANCE | COMBUSTION QUALITY NOx | 120ppm |
| | COMBUSTIBLES IN REFUSE | 3.2% |
| | LOAD CHANGE SPEED (50 ⟷ 100%) | 4%/min |
| | MINIMUM LOAD | 33% ECR (COAL) |

FIG. 13

TABLE 2

| TURBINE TYPE | CC4F-43 |
|---|---|
| REVOLUTIONS PER MINUTE | 3600/1800 r/min |
| STEAM CONDITIONS | 24.1MPa-625°C/625°C |
| TURBINE CONFIGURATION | 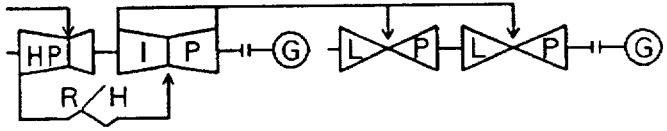 |
| CONSTRUCTION OF FIRST-STAGE BLADE | DOUBLE-FLOW, DOUBLE-TENON TYPE TANGENTIAL ENTRY DOVETAIL BLADE |
| FINAL-STAGE BLADE | BLADE OF TITANIUM ALLOY BEING 43 INCHES LONG |
| OVERALL LENGTHS OF TURBINES | HP-IP:13.2m, LP-LP:22.7m |
| BODY OF MAIN-STEAM STOP VALVE, BODY OF STEAM CONTROL VALVE | HIGH-STRENGTH 12Cr FORGED STEEL |
| HIGH-PRESSURE ROTOR | HIGH-STRENGTH 12Cr FORGED STEEL |
| INTERMEDIATE-PRESSURE ROTOR | HIGH-STRENGTH 12Cr FORGED STEEL |
| LOW-PRESSURE ROTOR | SUPERCLEAN TYPE, 3.5Ni-Cr-Mo-V FORGED STEEL |
| MOVING BLADE AT HIGH TEMPERATURE PART | FIRST STAGE, HIGH-STRENGTH 12Cr FORGED STEEL |
| HIGH-PRESSURE INNER CASING | HIGH-STRENGTH 9Cr CAST STEEL |
| HIGH-PRESSURE OUTER CASING | HIGH-STRENGTH Cr-Mo-V-B CAST STEEL |
| INTERMEDIATE-PRESSURE INNER CASING | HIGH-STRENGTH 9Cr CAST STEEL |
| INTERMEDIATE-PRESSURE OUTPUT CASING | HIGH-STRENGTH Cr-Mo-V-B CAST STEEL |
| THERMAL EFFICIENCY (FOR RATED OUTPUT, AT GENERATING END) | 47.1% |

(CC4F-43: CROSS-COMPOUND TYPE 4-FLOW EXHAUST, USING BLADE 43 INCHES LONG, HP: HIGH-PRESSURE PORTION, IP: INTERMEDIATE-PRESSURE PORTION, LP: LOW-PRESSURE)

FIG. 14

TABLE 3

(wt.%)

| NAMES OF PRINCIPAL COMPONENTS | | C | Si | Mn | Ni | Cr | Mo | W | V | Nb | N | Co | B | OTHER | Cr EQUIVALENT | NOTES |
|---|---|---|---|---|---|---|---|---|---|---|---|---|---|---|---|---|
| HIGH-PRESSURE PORTION AND INTERMEDIATE-PRESSURE PORTION | ROTOR | 0.11 | 0.03 | 0.52 | 0.49 | 10.98 | 0.19 | 2.60 | 0.21 | 0.07 | 0.019 | 2.70 | 0.015 | — | 5.11 (≤9.5) | FORGED STEEL |
| | BLADE (FIRST STAGE) | 0.10 | 0.04 | 0.47 | 0.51 | 11.01 | 0.15 | 2.62 | 0.19 | 0.08 | 0.020 | 2.81 | 0.016 | — | 5.07 (≤10) | " |
| | NOZZLE (FIRST STAGE) | 0.09 | 0.04 | 0.55 | 0.59 | 10.50 | 0.14 | 2.54 | 0.18 | 0.06 | 0.015 | 2.67 | 0.013 | — | 4.54 ( " ) | " |
| | INNER CASING | 0.12 | 0.19 | 0.50 | 0.68 | 8.95 | 0.60 | 1.68 | 0.18 | 0.06 | 0.040 | — | 0.002 | — | 7.57 | CAST STEEL |
| | OUTER CASING | 0.12 | 0.21 | 0.32 | 0.25 | 1.51 | 1.22 | — | 0.22 | — | — | — | 0.005 | Ti 0.05 | — | " |
| | TIGHTENING BOLT FOR INNER CASING | 0.11 | 0.10 | 0.50 | 0.60 | 10.82 | 0.23 | 2.80 | 0.23 | 0.08 | 0.021 | 3.00 | 0.020 | — | 4.72 | FORGED STEEL |
| LOW-PRESSURE PORTION | ROTOR | 0.25 | 0.03 | 0.04 | 3.68 | 1.75 | 0.36 | — | 0.13 | — | — | — | | — | — | FORGED STEEL |
| | BLADE | 0.11 | 0.20 | 0.53 | 0.39 | 12.07 | 0.07 | — | — | — | — | — | — | — | — | " |
| | NOZZLE | 0.12 | 0.18 | 0.50 | 0.43 | 12.13 | 0.10 | — | — | — | — | — | — | — | — | " |
| | INNER CASING | 0.25 | 0.51 | — | — | — | — | — | — | — | — | — | — | — | — | CAST STEEL |
| | OUTER CASING | 0.24 | 0.50 | — | — | — | — | — | — | — | — | — | — | — | — | " |
| CASING OF MAIN-STEAM STOP VALVE | | 0.10 | 0.19 | 0.48 | 0.65 | 8.96 | 0.60 | 1.62 | 0.20 | 0.05 | 0.042 | — | 0.002 | — | 8.56 | CAST STEEL |
| CASING OF STEAM CONTROL VALVE | | 0.12 | 0.21 | 0.52 | 0.63 | 9.00 | 0.63 | 1.70 | 0.17 | 0.06 | 0.039 | — | 0.001 | — | 7.97 | " | psi1-14

FIG. 15

TABLE 4

| NAMES OF PRINCIPAL COMPONENTS | | TENSILE STRENGTH (kg/mm²) | 0.2% PROOF STRESS (kg/mm²) | ELONGATION (%) | CONTRACTION OF AREA (%) | IMPACT VALUE (kg-m) | FATT (%) | 10⁵-h CREEP RUPTURE STRENGTH (kg/mm²) | | | HSDF TREATMENT CONDITIONS |
|---|---|---|---|---|---|---|---|---|---|---|---|
| | | | | | | | | 625°C | 575°C | 450°C | |
| HIGH-PRESSURE PORTION AND INTERMEDIATE-PRESSURE PORTION | ROTOR | 90.5 | 76.5 | 20.6 | 66.8 | 3.8 | 40 | 17.0 | — | — | 1050°C×15h WATER SPRAY QUENCHING, 570°C×20h FURNACE COOLING, 690°C×20h FURNACE COOLING |
| | BLADE (FIRST STAGE) | 93.4 | 81.5 | 20.9 | 69.8 | 4.1 | — | 18.1 | — | — | 1075°C×1.5h OIL COOLING, 740°C×5h AIR COOLING |
| | NOZZLE (FIRST STAGE) | 93.9 | 80.9 | 21.4 | 70.3 | 4.8 | — | 17.8 | — | — | 1050°C×1.5h OIL COOLING, 690°C×5h AIR COOLING |
| | INNER CASING | 77.7 | 60.7 | 19.0 | 65.3 | 2.3 | — | 11.2 | — | — | 1050°C×8h AIR BLAST QUENCHING, 600°C×20h FURNACE COOLING, 730°C×10h FURNACE COOLING |
| | OUTER CASING | 68.6 | 57.2 | 20.4 | 65.4 | 1.5 | — | — | 12.5 | — | 1050°C×8h AIR BLAST QUENCHING, 725°C×10h FURNACE COOLING |
| | TIGHTENING BOLT FOR INNER CASING | 107.1 | 91.8 | 19.5 | 86.7 | 2.0 | — | 18.0 | — | — | 1075°C×2h OIL COOLING, 740°C×5h AIR COOLING |
| LOW-PRESSURE PORTION | ROTOR | 91.8 | 80.6 | 22.0 | 70.1 | 19.1 | −50 | — | — | 36 | 950°C×30h WATER SPRAY QUENCHING, 605°C×45h FURNACE COOLING |
| | BLADE | 80.9 | 66.6 | 22.1 | 67.5 | 3.5 | — | — | — | 27 | 950°C×1.5h OIL COOLING, 650°C×5h AIR COOLING |
| | NOZZLE | 79.8 | 65.7 | 22.4 | 69.6 | 3.8 | — | — | — | 26 | 950°C×1.5h OIL COOLING, 650°C×5h AIR COOLING |
| | INNER CASING | 41.5 | 22.2 | 22.2 | 81.0 | — | — | — | — | — | — |
| | OUTER CASING | 41.1 | 20.3 | 24.5 | 80.5 | — | — | — | — | — | — |
| CASING OF MAIN-STEAM STOP VALVE | | 77.0 | 61.0 | 18.6 | 65.0 | 2.5 | — | 11.2 | — | — | 1050°C×8h AIR BLAST QUENCHING, 600°C×20h FURNACE COOLING, 730°C×10h FURNACE COOLING |
| CASING OF STEAM CONTROL VALVE | | 77.5 | 61.6 | 18.2 | 64.8 | 2.4 | — | 11.0 | — | — | 1050°C×8h AIR BLAST QUENCHING, 600°C×20h FURNACE COOLING, 730°C×10h FURNACE COOLING | psi1-14

FIG. 16

TABLE 5

| ID SYMBOL | C | Si | Mn | P | S | Ni | Cr | Mo | Fe |
|---|---|---|---|---|---|---|---|---|---|
| A | 0.06 | 0.45 | 0.65 | 0.010 | 0.011 | — | 7.80 | 0.50 | BALANCE |
| B | 0.03 | 0.65 | 0.70 | 0.009 | 0.008 | — | 5.13 | 0.53 | 〃 |
| C | 0.03 | 0.79 | 0.56 | 0.009 | 0.012 | 0.01 | 2.34 | 1.04 | 〃 |
| D | 0.03 | 0.70 | 0.90 | 0.007 | 0.016 | 0.03 | 1.30 | 0.57 | 〃 |

FIG. 17

TABLE 6

| SAMPLE NO. | 1ST LAYER | 2ND LAYER | 3RD LAYER | 4TH LAYER | 5TH LAYER | 6TH LAYER | 7TH LAYER | 8TH LAYER |
|---|---|---|---|---|---|---|---|---|
| 1 | A | B | C | C | C | C | C | C |
| 2 | B | C | D | D | D | D | D | D |
| 3 | A | B | C | D | D | D | D | D |

(Letters A ~D are the identification symbols of welding rods employed.)

FIG. 18

TABLE 7

| No. | CHEMICAL CONSTITUENTS (wt.%) | | | | | | | | | | | | CREEP RUPTURE TIME (h) 625°C-30kgf/mm² | |
|---|---|---|---|---|---|---|---|---|---|---|---|---|---|---|
| | C | Si | Mn | Ni | Cr | Mo | W | V | Nb | Co | N | B | Fe | ROTOR SHAFT | BLADE |
| 1 | 0.11 | 0.01 | 0.50 | 0.54 | 10.72 | 0.15 | 2.61 | 0.20 | 0.09 | 2.15 | 0.025 | 0.014 | Bal | 140 | 278 |
| 2 | 0.11 | 0.01 | 0.50 | 0.50 | 10.98 | 0.15 | 2.59 | 0.21 | 0.09 | 2.87 | 0.025 | 0.014 | ″ | 161 | 315 |
| 3 | 0.11 | 0.01 | 0.51 | 0.53 | 11.00 | 0.16 | 2.55 | 0.22 | 0.08 | 5.79 | 0.027 | 0.015 | ″ | 241 | 508 |
| 4 | 0.11 | 0.01 | 0.48 | 0.49 | 11.03 | 0.18 | 2.60 | 0.19 | 0.08 | 9.43 | 0.030 | 0.016 | ″ | 240 | 488 |
| 5 | 0.12 | 0.01 | 1.30 | 0.11 | 11.24 | 0.20 | 2.65 | 0.18 | 0.11 | 2.98 | 0.051 | 0.003 | ″ | 192 | 392 |
| 6 | 0.13 | 0.01 | 0.15 | 0.89 | 11.35 | 0.09 | 2.91 | 0.27 | 0.10 | 4.50 | 0.045 | 0.027 | ″ | 219 | 456 |
| 7 | 0.09 | 0.01 | 0.64 | 0.09 | 10.54 | 0.32 | 3.33 | 0.14 | 0.15 | 2.77 | 0.028 | 0.020 | ″ | 111 | 225 |
| 8 | 0.15 | 0.01 | 0.09 | 0.33 | 12.63 | 0.27 | 2.46 | 0.16 | 0.08 | 3.01 | 0.035 | 0.022 | ″ | 140 | 286 |
| 9 | 0.12 | 0.01 | 0.37 | 0.71 | 10.22 | 0.14 | 2.41 | 0.23 | 0.06 | 3.45 | 0.034 | 0.018 | ″ | 126 | 258 |
| 10 | 0.11 | 0.01 | 0.51 | 0.50 | 10.78 | 0.15 | 2.58 | 0.21 | 0.14 | – | 0.026 | 0.013 | ″ | 34 | 78 |

FIG. 19

TABLE 8

| SAMPLE | C | Si | Mn | Ni | Cr | Mo | W | V | Nb | N | B | OTHER | Cr EQUIVALENT | Ni/W |
|---|---|---|---|---|---|---|---|---|---|---|---|---|---|---|
| 1 | 0.15 | 0.44 | 0.77 | 0.20 | 1.28 | 1.12 | — | 0.19 | — | — | — | Ti 0.02 | — | — |
| 2 | 0.13 | 0.40 | 0.52 | 0.55 | 10.25 | 0.90 | — | 0.20 | 0.10 | 0.05 | — | — | 9.01 | — |
| 3 | 0.12 | 0.22 | 0.51 | 0.82 | 9.05 | 0.59 | 1.59 | 0.21 | 0.06 | 0.05 | 0.0031 | — | 7.13 | — |
| 4 | 0.13 | 0.20 | 0.50 | 0.61 | 8.97 | 0.11 | 1.60 | 0.19 | 0.07 | 0.05 | 0.0019 | — | 5.31 | — |
| 5 | 0.13 | 0.22 | 0.49 | 0.95 | 9.00 | 0.65 | 1.06 | 0.20 | 0.05 | 0.05 | 0.0015 | — | 5.48 | 0.90 |
| 6 | 0.12 | 0.20 | 0.48 | 0.61 | 9.00 | 0.62 | 1.66 | 0.19 | 0.07 | 0.03 | 0.0010 | — | 8.21 | 0.37 |
| 7 | 0.12 | 0.19 | 0.50 | 0.58 | 9.10 | 0.68 | 1.68 | 0.20 | 0.06 | 0.02 | 0.0015 | — | 8.66 | 0.35 |

FIG. 20

TABLE 9

| SAMPLE | TENSILE STRENGTH (kg/mm) | ELONGATION (%) | CONTRACTION OF AREA (%) | ABSORBED IMPACT ENERGY (kg-m) | 625°C, 10⁵h CREEP RUPTURE STRENGTH (kg/mm²) | WELDING CRACK |
|---|---|---|---|---|---|---|
| 1 | 67.4 | 22.3 | 68.5 | 2.1 | 3 | ABSENT |
| 2 | 71.0 | 18.0 | 59.9 | 1.9 | 6 | ABSENT |
| 3 | 72.8 | 19.7 | 64.8 | 2.1 | 9.7 | PRESENT |
| 4 | 71.6 | 19.9 | 65.8 | 2.1 | 8.5 | ABSENT |
| 5 | 69.8 | 20.3 | 62.7 | 3.5 | 6.8 | — |
| 6 | 72.5 | 20.2 | 64.8 | 2.4 | 10 | ABSENT |
| 7 | 72.7 | 21.0 | 65.3 | 2.3 | 10.2 | ABSENT |

5,749,228

1

STEAM-TURBINE POWER PLANT AND STEAM TURBINE

This is a continuation of application Ser. No. 08/391,945, filed Feb. 21, 1995.

BACKGROUND OF THE INVENTION

1. Field of the Invention

The present invention relates to a novel steam turbine of high efficiency and high temperature, and more particularly to a steam turbine in which a main steam temperature and/or a reheat steam temperature are/is 620 (°C.) or above. It also relates to a steam-turbine power plant which employs such steam turbines.

2. Description of the Related Art

Conventional steam turbines have had a steam temperature of 566 (°C.) at maximum and a steam pressure of 246 (atg).

It is desired, however, to heighten the efficiencies of thermal power plants from the viewpoints of the exhaustion of fossil fuel such as petroleum and coal, the saving of energy, and the prevention of environmental pollution. For enhancing the power generation efficiencies, it is the most effective expedient to raise the steam temperatures of the steam turbines. Regarding materials for such high-efficiency turbines, 1Cr—1Mo—1/4V ferritic low-alloy forged steel and 11Cr—1Mo—V—Nb—N forged steel are known as rotor materials, while 1Cr—1Mo—1/4V ferritic low-alloy cast steel and 11Cr—1Mo—V—Nb—N cast steel are known as casing materials. Among these materials, austenitic alloys disclosed in the official gazette of Japanese Patent Applications Laid-open No. 180044/1987 and No. 23749/1986, and martensitic steel disclosed in the official gazette of Japanese Patent Applications, Laid-open No. 147948/1992, No. 290950/1990 and No. 371551/1992 are especially known as materials whose high-temperature strengths are superior.

Although, in the laid-open applications mentioned above, the rotor materials, the casing materials, etc. are disclosed, almost no consideration is given to the steam turbines and the thermal power plants which are accompanied by the higher steam temperatures as stated above.

Further, a supercritical steam turbine is known from the official gazette of Japanese Patent Applications, Laid-open No. 248806/1987, but a plant system as a whole is not considered at all.

SUMMARY OF THE INVENTION

An object of the present invention is to provide a steam turbine which permits a heightened steam temperature of 610–660 (°C.) by heat-resisting ferritic steel and which exhibits a high thermal efficiency, and a steam-turbine power plant which employs the steam turbine.

Another object of the present invention is to provide steam turbines whose running temperatures are 610–660 (°C.) and whose basic designs are substantially the same, and a steam-turbine power plant which employs the steam turbines.

The present invention consists in improvement to a steam-turbine power plant having a high-pressure turbine and an intermediate-pressure turbine which are joined to each other, and low-pressure turbines which are connected in tandem. The improvement comprises that steam inlet of each of the high-pressure and intermediate-pressure turbines which leads to moving blades of a first-stage included in each of the high-pressure and intermediate-pressure turbines being at a temperature of 610–660 (°C.) (preferably 615–640 (°C.), and more preferably 620–630 (°C.)). Further, that steam inlet of each of the low-pressure turbines which leads to moving blades of a first stage included in each of the low-pressure turbines is at a temperature of 380–475 (°C.) (preferably 400–430 (°C.)), and a rotor shaft, the moving blades, fixed blades and a casing, which are included in each of the high-pressure and intermediate-pressure turbines and which are exposed to the temperature of the steam inlet of each of the high-pressure and intermediate-pressure turbines, are made of high-strength martensitic steel which contains 8–13 (weight-%) of Cr.

Further, the present invention consists in an improvement to a steam-turbine power plant having a high-pressure turbine and an intermediate-pressure turbine which are joined to each other, and low-pressure turbines which are connected in tandem. In the improvement, that steam inlet of each of the high-pressure and intermediate-pressure turbines which leads to moving blades of a first stage included in each of the high-pressure and intermediate-pressure turbines is at a temperature of 610–660 (°C.) (preferably 615–640 (°C.), and more preferably 620–630 (°C.)). Further, that steam inlet of each of the low-pressure turbines which leads to moving blades of a first stage included in each of the low-pressure turbines is at a temperature of 380–475 (°C.) (preferably 400–430 (°C.)), and a rotor shaft, fixed blades and a casing, which are included in each of the high-pressure and intermediate-pressure turbines and which are exposed to the temperature of the steam inlet of each of the high-pressure and intermediate-pressure turbines, are made of high-strength martensitic steel which contains 8–13 (weight-%) of Cr.

Further, the present invention consists in a steam turbine comprising a rotor shaft, moving blades which are assembled on the rotor shaft, fixed blades which guide inflow of steam to the moving blades, and an inner casing which holds the fixed blades. The steam flows into a first stage of the moving blades at a temperature of 610–660 (°C.) and under a pressure of at least 250 (kg/cm$^2$) (preferably 246–316 (kg/cm$^2$)) or 170–200 (kg/cm$^2$). The rotor shaft and, at least, first-stage ones of the moving blades and the fixed blades are made of high-strength martensitic steel of fully-tempered martensitic structure which exhibits a $10^5$-hour creep rupture strength of at least 15 (kg/mm$^2$) (preferably 17 (kg/mm$^2$)) at a temperature corresponding to the respective steam temperatures (preferably 610 (°C.), 625 (°C.), 640 (°C.), 650 (°C.) and 660 (°C.)), and which contains 9.5–13 (weight-%) (preferably 10.5–11.5 (weight-%)) of Cr, and the inner casing is made of martensitic cast steel which exhibits a $10^5$-hour creep rupture strength of at least 10 (kg/mm$^2$) (preferably 10.5 (kg/mm$^2$)) at the temperature corresponding to the respective steam temperatures, and which contains 8–9.5 (weight-%) of Cr.

Further, the present invention consists in an improvement to a steam turbine having a rotor shaft, moving blades which are assembled on the rotor shaft, fixed blades which guide inflow of steam to the moving blades, and an inner casing which holds the fixed blades. In the improvement, the rotor shaft and, at least, first-stage ones of the moving blades and the fixed blades are made of high-strength martensitic steel which contains 0.05–0.20 (%) of C, at most 0.15 (%) of Si, 0.03–1.5 (%) of Mn, 9.5–13 (%) of Cr, 0.05–1.0 (%) of Ni, 0.05–0.35 (%) of V, 0.01–0.20 (%) of Nb, 0.01–0.06 (%) of N, 0.05–0.5 (%) of Mo, 1.0–4.0 (%) of W, 2–10 (%) of Co and 0.0005—0.03 (%) of B, and which has at least 78 (%) of Fe, the percentages being given in terms of weight, and the inner casing is made of high-strength martensitic steel which contains 0.06–0.16 (%) of C, at most 0.5 (%) of Si, at most 1 (%) of Mn, 0.2–1.0 (%) of Ni, 8–12 (%) of Cr, 0.05–0.35 (%) of V, 0.01–0.15 (%) of Nb, 0.01–0.8 (%) of N, at most 1 (%) of Mo, 1–4 (%) of W and 0.0005–0.03 (%) of B, and which has at least 85 (%) of Fe, the percentages being given in terms of weight.

Further, the present invention consists in the improvement to a high-pressure steam turbine having a rotor shaft, moving blades which are assembled on the rotor shaft, fixed blades which guide inflow of steam to the moving blades, and an inner casing which holds the fixed blades, wherein the moving blades are arranged including at least 10 stages on each side in a lengthwise direction of the rotor shaft, except a first stage which is of double flow, and the rotor shaft has a distance (L) of at least 5000 (mm) (preferably 5200–5500 (mm)) between centers of bearings in which it is journaled, and a minimum diameter (D) of at least 600 (mm) (preferably 620–700 (mm)) at its parts which correspond to the fixed blades, a ratio (L/D) between the distance (L) and the diameter (D) being 8.0–9.0 (preferably 8.3–8.7), and it is made of high-strength martensitic steel which contains 9–13 (weight-%) of Cr.

Further, the present invention consists in the improvement in an intermediate-pressure steam turbine having a rotor shaft, moving blades which are assembled on the rotor shaft, fixed blades which guide inflow of steam to the moving blades, and an inner casing which holds the fixed blades, wherein the moving blades have a double-flow construction in which at least 6 stages are included on each side in a lengthwise direction of the rotor shaft, in a bilaterally symmetric arrangement on both sides, and in which the first stages of the arrangement are assembled on a central part of the rotor shaft in the lengthwise direction, and the rotor shaft has a distance (L) of at least 5200 (mm) (preferably 5300–5800 (mm)) between centers of bearings in which it is journaled, and a minimum diameter (D) of at least 620 (mm) (preferably 620–680 (mm)) at its parts which correspond to the fixed blades, a ratio (L/D) between the distance (L) and the diameter (D) being 8.2–9.2 (preferably 8.5–9.0), and it is made of high-strength martensitic steel which contains 9–13 (weight-%) of Cr.

Further, the present invention consists in the improvement to a low-pressure steam turbine having a rotor shaft, moving blades which are assembled on the rotor shaft, fixed blades which guide inflow of steam to the moving blades, and an inner casing which holds the fixed blades, wherein the moving blades have a double-flow construction in which at least 8 stages are included on each side in a lengthwise direction of the rotor shaft, in a bilaterally symmetric arrangement on both sides, and in which the first stages of the arrangement are assembled on a central part of the rotor shaft in the lengthwise direction, the rotor shaft has a distance (L) of at least 7200 (mm) (preferably 7400–7600 (mm)) between centers of bearings in which it is journaled, and a minimum diameter (D) of at least 1150 (mm) (preferably 1200–1350 (mm)) at its parts which correspond to the fixed blades, a ratio (L/D) between the distance (L) and the diameter (D) being 5.4–6.3 (preferably 5.7–6.1), and it is made of Ni—Cr—Mo—V low-alloy steel which contains 3.25–4.25 (weight-%) of Ni, and each of the final-stage moving blades of the arrangement has a length of at least 40 (inches) and is made of a Ti-based alloy.

Further, the present invention consists in the improvement to a steam-turbine power plant having a high-pressure turbine and an intermediate-pressure turbine which are joined to each other, and two low-pressure turbines which are connected in tandem, wherein that steam inlet of each of the high-pressure and intermediate-pressure turbines which leads to moving blades of a first stage included in each of the high-pressure and intermediate-pressure turbines is at a temperature of 610–660 (°C.), that steam inlet of the low-pressure turbine which leads to moving blades of a first stage included in the low-pressure turbine is at a temperature of 380–475 (°C.), the first-stage moving blade of the high-pressure turbine, and that part of a rotor shaft of the high-pressure turbine on which the first-stage moving blade is assembled are held at metal temperatures which are not, at least, 40 (°C.) lower than the temperature of the steam inlet of the high-pressure turbine leading to the first-stage moving blade (preferably, the metal temperatures are 20–35 (°C.) lower than the steam temperature), the first-stage moving blade of the intermediate-pressure turbine, and that part of a rotor shaft of the intermediate-pressure turbine on which the first-stage moving blades are assembled are held at metal temperatures which are not, at least, 75 (°C.) lower than the temperature of the steam inlet of the intermediate-pressure turbine leading to the first-stage moving blade (preferably, the metal temperatures are 50–70 (°C.) lower than the steam temperature), and the rotor shaft of each of the high-pressure and intermediate-pressure turbines and, at least, the first-stage one of the moving blades of each of the high-pressure and intermediate-pressure turbines are made of martensitic steel which contains 9.5–13 (weight-%) of Cr.

Further, the present invention consists in the improvement to a coal-fired power plant having a coal-fired boiler, steam turbines which are driven by steam developed by the boiler, and one or more, preferably two, generators which are driven by the steam turbines and which can generate an output of at least 1000 (MW), wherein the steam turbines include a high-pressure turbine, an intermediate-pressure turbine which is joined to the high-pressure turbine, and two low-pressure turbines, that steam inlet of each of the high-pressure and intermediate-pressure turbines which leads to moving blades of a first stage included in each of the high-pressure and intermediate-pressure turbines is at a temperature of 610–660 (°C.), that steam inlet of the low-pressure turbine which leads to moving blades of a first stage included in the low-pressure turbine is at a temperature of 380–475 (°C.), the steam heated by a superheater of the boiler to a temperature which is at least 3 (°C.) (preferably 3–10 (°C.), more preferably 3–7 (°C.)) higher than the temperature of the steam inlet of the high-pressure turbine leading to the first-stage moving blade thereof is caused to flow into the first-stage moving blade of the high-pressure turbine, the steam having come out of the high-pressure turbine is heated by a reheater of the boiler to a temperature which is at least 2 (°C.) (preferably 2–10 (°C.), more preferably 2–5 (°C.)) higher than the temperature of the steam inlet of the intermediate-pressure turbine leading to the first-stage moving blade thereof, whereupon the heated steam is caused to flow into the first-stage moving blade of the intermediate-pressure turbine, and the steam having come out of the intermediate-pressure turbine is heated by an economizer of the boiler to a temperature which is at least 3 (°C.) (preferably 3–10 (°C.), more preferably 3–6 (°C.)) higher than the temperature of the steam inlet of the low-pressure turbine leading to the first-stage moving blade thereof, whereupon the heated steam is caused to flow into the first-stage moving blade of the low-pressure turbine.

Further, the present invention consists in the improvement to the low-pressure steam turbine stated before; wherein that steam inlet of the low-pressure turbine which leads to a first-stage one of the moving blades is at a temperature of 380–475 (°C.) (preferably 400–450 (°C.)), and the rotor shaft is made of low-alloy steel which contains 0.2–0.3 (%) of C, at most 0.05 (%) of Si, at most 0.1 (%) of Mn, 3.25–4.25 (%) of Ni, 1.25–2.25 (%) of Cr, 0.07–0.20 (%) of Mo, 0.07–0.2 (%) of V and at least 92.5 (%) of Fe, the percentages being given in terms of weight.

The present invention consists in the improvement to the high-pressure steam turbine stated before; wherein the moving blades are arranged including at least 7 stages (preferably 9–12 stages), and they have lengths of 35–210 (mm) in a region from an upstream side of the steam flow to a downstream side thereof, diameters of those parts of the rotor shaft on which the moving blades are assembled are larger than diameters of those parts of the rotor shaft which correspond to the fixed blades; and widths of the moving-blade assembling parts of the rotor shaft in an axial direction of the rotor shaft being stepwise larger on the downstream side than on the upstream side at, at least, 3 stages (preferably 4–7 stages), and their ratios to the lengths of the moving blades decrease from the upstream side toward the downstream side within a range of 0.6–1.0 (preferably 0.65–0.95).

Further, in the high-pressure steam turbine stated before, the present invention consists in the improvement wherein the moving blades are arranged including at least 7 stages, and they have lengths of 35–210 (mm) in a region from an upstream side of the steam flow to a downstream side thereof, ratios between the lengths of the moving blades of the respectively adjacent stages are at most 1.2 (preferably 1.10–1.15), and they increase gradually toward the downstream side, and the lengths of the moving blades are larger on the downstream side than on the upstream side.

Further, in the high-pressure steam turbine stated before, the present invention consists in the improvement wherein the moving blades are arranged including at least 7 stages, and they have lengths of 35–210 (mm) in a region from an upstream side of the steam flow to a downstream side thereof, and widths of those parts of the rotor shaft which correspond to the fixed blades, the widths being taken in an axial direction of the rotor shaft, are stepwise smaller on the downstream side than on the upstream side at, at least, 2 stages (preferably 2–4 stages), and their ratios to the lengths of the downstream-side moving blades decrease stepwise toward the downstream side within a range of 0.65–1.8 (preferably 0.7–1.7).

The present invention consists in the improvement in the intermediate-pressure steam turbine stated before, wherein the moving blades have a double-flow construction in which at least 6 stages (preferably 6–9 stages) are included on each side in a lengthwise direction of the rotor shaft, in a bilaterally symmetric arrangement on both sides, and they have lengths of 100–300 (mm) in a region from an upstream side of the steam flow to a downstream side thereof, diameters of those parts of the rotor shaft on which the moving blades being assembled are larger than diameters of those parts of the rotor shaft which correspond to the fixed blades, and widths of the moving-blade assembling parts of the rotor shaft in an axial direction of the rotor shaft being-stepwise larger on the downstream side than on the upstream side at, at least, 2 stages (preferably 3–6 stages), and their ratios to the lengths of the moving blades decrease from the upstream side toward the downstream side within a range of 0.45–0.75 (preferably 0.5–0.7).

Further, in the intermediate-pressure steam turbine stated before, the present invention consists in the improvement wherein the moving blades have a double-flow construction in which at least 6 stages are included on each side in a lengthwise direction of the rotor shaft, in a bilaterally symmetric arrangement on both sides, and they have lengths of 100–300 (mm) in a region from an upstream side of the steam flow to a downstream side thereof, and the lengths of the respectively adjacent moving blades are larger on the downstream side than on the upstream side, and their ratios are at most 1.3 (preferably 1.1–1.2) and increase gradually toward the downstream side.

Further, in the intermediate-pressure steam turbine stated before, the present invention consists in the improvement wherein the moving blades have a double-flow construction in which at least 6 stages are included on each side in a lengthwise direction of the rotor shaft, in a bilaterally symmetric arrangement on both the sides, and they have lengths of 100–300 (mm) in a region from an upstream side of the steam flow to a downstream side thereof, and widths of those parts of the rotor shaft which correspond to the fixed blades, the widths being taken in an axial direction of the rotor shaft, are stepwise smaller on the downstream side than on the upstream side at, at least, 2 stages (preferably 3–6 stages), and their ratios to the lengths of the downstream-side moving blades decrease stepwise toward the downstream side within a range of 0.45–1.60 (preferably 0.5–1.5).

The present invention consists in the improvement in the low-pressure steam turbine stated before; wherein the moving blades have a double-flow construction in which at least 8 stages (preferably 8–10 stages) are included on each side in a lengthwise direction of the rotor shaft, in a bilaterally symmetric arrangement on both sides, and they have lengths of 90–1300 (mm) in a region from an upstream side of the steam flow to a downstream side thereof; diameters of those parts of the rotor shaft on which the moving blades are assembled are larger than diameters of those parts of the rotor shaft which correspond to the fixed blades; and widths of the moving-blade assembling parts of the rotor shaft in an axial direction of the rotor shaft are stepwise larger on the downstream side than on the upstream side at, at least, 3 stages (preferably 4–7 stages), and their ratios to the lengths of the moving blades decrease from the upstream side toward the downstream side within a range of 0.15–1.0 (preferably 0.15–0.91).

Further, in the low-pressure steam turbine stated before, the present invention consists in the improvement wherein the moving blades have a double-flow construction in which at least 8 stages are included on each side in a lengthwise direction of the rotor shaft, in a bilaterally symmetric arrangement on both sides, and they have lengths of 90–1300 (mm) in a region from an upstream side of the steam flow to a downstream side thereof; and the lengths of the moving blades of the respectively adjacent stages are larger on the downstream side than on the upstream side, and their ratios increase gradually toward the downstream side within a range of 1.2–1.7 (preferably 1.3–1.6).

Further, in the low-pressure steam turbine stated before, the present invention consists in the improvement wherein the moving blades have a double-flow construction in which at least 8 stages are included on each side in a lengthwise direction of the rotor shaft, in a bilaterally symmetric arrangement on both sides, and they have lengths of 90–1300 (mm) in a region from an upstream side of the steam flow to a downstream side thereof; and widths of those parts of the rotor shaft which correspond to the fixed blades, the widths being taken in an axial direction of the rotor shaft, are stepwise larger on the downstream side than on the upstream side at, at least, 3 stages (preferably 4–7 stages), and their ratios to the lengths of the respectively adjacent moving blades on the downstream side decrease stepwise toward the downstream side within a range of 0.2–1.4 (preferably 0.25–1.25).

The present invention consists in the improvement in a high-pressure steam turbine having a rotor shaft, moving blades which are assembled on the rotor shaft, fixed blades which guide inflow of steam to the moving blades, and an inner casing which holds the fixed blades; wherein the moving blades are arranged including at least 7 stages; diameters of those parts of the rotor shaft which correspond to the fixed blades are smaller than diameters of those parts of the rotor shaft which correspond to the assembled moving blades; widths of the rotor shaft parts corresponding to the fixed blades, in an axial direction of the rotor shaft are stepwise larger on an upstream side of the steam flow than on a downstream side thereof at, at least, 2 of the stages (preferably 2–4 stages), and the width between the final stage of the moving blades and the stage thereof directly preceding the final stage is 0.75–0.95 (preferably 0.8–0.9, more preferably 0.84–0.88) times as large as the width between the second stage and the third stage of the moving blades; and widths of the rotor shaft parts corresponding to the assembled moving blades, in the axial direction of the rotor shaft are stepwise larger on the downstream side of the steam flow than on the upstream side thereof at, at least, 3 of the stages (preferably 4–7 stages), and the axial width of the final stage of the moving blades is 1–2 (preferably 1.4–1.7) times as large as the axial width of the second stage of the moving blades.

The present invention consists in the improvement in an intermediate-pressure steam turbine having a rotor shaft, moving blades which are assembled on the rotor shaft, fixed blades which guide inflow of steam to the moving blades, and an inner casing which holds the fixed blades; wherein the moving blades are arranged including at least 6 stages; diameters of those parts of the rotor shaft which correspond to the fixed blades are smaller than diameters of those parts of the rotor shaft which correspond to the assembled moving blades; widths of the rotor shaft parts corresponding to the fixed blades, in an axial direction of the rotor shaft are stepwise larger on an upstream side of the steam flow than on a downstream side thereof at, at least, 2 of the stages (preferably 3–6 stages), and the width between the final stage of the moving blades and the stage thereof directly preceding the final stage is 0.55–0.8 (preferably 0.6–0.7) times as large as the width between the first stage and the second stage of the moving blades; and widths of the rotor shaft parts corresponding to the assembled moving blades, in the axial direction of the rotor shaft are stepwise larger on the downstream side of the steam flow than on the upstream side thereof at, at least, 2 of the stages (preferably 3–6 stages), and the axial width of the final stage of the moving blades is 0.8–2 (preferably 1–1.5) times as large as the axial width of the first stage of the moving blades.

The present invention consists in the improvement in a low-pressure steam turbine having a rotor shaft, moving blades which are assembled on the rotor shaft, fixed blades which guide inflow of steam to the moving blades, and an inner casing which holds the fixed blades; wherein the moving blades have a double-flow construction in which at least 8 stages are included on each side in an axial direction of the rotor shaft, in a bilaterally symmetric arrangement on both sides; diameters of those parts of the rotor shaft which correspond to the fixed blades are smaller than diameters of those parts of the rotor shaft which correspond to the assembled moving blades; widths of the rotor shaft parts corresponding to the fixed blades, in the axial direction of the rotor shaft are stepwise larger on an upstream side of the steam flow than on a downstream side thereof at, at least, 3 of the stages (preferably 4–7 stages), and the width between the final stage of the moving blades and the stage thereof directly preceding the final stage is 1.5–2.5 (preferably 1.7–2.2) times as large as the width between the first stage and the second stage of the moving blades; and widths of the rotor shaft parts corresponding to the assembled moving blades, in the axial direction of the rotor shaft, are stepwise larger on the downstream side of the steam flow than on the upstream side thereof at, at least, 3 of the stages (preferably 4–7 stages), and the axial width of the final stage of the moving blades is 2–3 (preferably 2.2–2.7) times as large as the axial width of the first stage of the moving blades.

The designs of the high-pressure, intermediate-pressure and low-pressure turbines described above can be rendered similar for any of the service steam temperatures, 610–660 (°C.) of the respective turbines.

In the rotor material of the present invention, alloy contents should preferably be controlled so as to become 4–8 in terms of a Cr equivalent which is computed by a formula given below, in order that a superior high-temperature strength, a low-temperature toughness and a high fatigue strength may be attained from the fully-tempered martensitic structure.

Besides, in the heat-resisting cast steel of the present invention, which is used as the casing material, alloy contents should preferably be controlled so as to become 4–10 in terms of the Cr equivalent which is computed by the formula given below, in order that a superior high-temperature strength, a low-temperature toughness and a high fatigue strength may be attained by controlling the alloying constituents so as to establish a martensitic structure tempered to at least 95 (%), in other words, containing at most 5 (%) of δ (delta) ferrite.

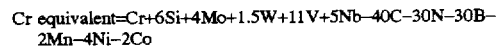

Regarding the 12Cr heat-resisting steel of the present invention, especially in a case where the steel is used with steam at or above 621 (°C.), it should preferably be endowed with a 625-°C. $10^5$-h creep rupture strength of at least 10 (kgf/mm$^2$) and a room-temperature absorbed impact energy of at least 1 (kgf-m).

Now, the materials specified in the present invention will be itemized as (1)–(3) below.

(1) There will be elucidated the reasons for restricting the constituents of the heat-resisting ferritic steel which is used in the present invention for making the rotors, blades, nozzles and inner-casing tightening bolts of the high-pressure and intermediate-pressure steam turbines, and the first-stage diaphragm of the intermediate-pressure portion:

The constituent C (carbon) is an element which is indispensable to ensuring hardenability upon quenching, and precipitating carbides in a tempering heat-treatment process so as to enhance a high-temperature strength. Besides, the element C is required at a level of at least 0.05 (%) in order to attain a high tensile strength. However, in a case where the C content exceeds 0.20 (%), the ferritic steel comes to have an unstable metallographic structure and spoils the long-time creep rupture strength thereof when exposed to high temperatures for a prolonged period of time. Therefore, the C content is restricted to within 0.05–0.20 (%). It should desirably be within 0.08–0.13 (%), and particularly preferably be within 0.09–0.12 (%)

The constituent Mn (manganese) is added as a deoxidizer etc., and the deoxidizing effect thereof is achieved by a small amount of addition. A large amount of addition exceeding 1.5 (%) is unfavorable because it lowers the creep rupture strength. Especially; a range of 0.03–0.20 (%) or a range of 0.3–0.7 (%) is preferable, and a range of 0.35–0.65 (%) is more preferable for the latter. As the Mn content is made lower, a higher strength is attained. On the other hand, as the Mn content is made higher, the workability of the ferritic steel improves.

The constituent Si (silicon) is also added as a deoxidizer, but the Si deoxidation is dispensed if a steelmaking technique such as the vacuum C deoxidation or the like is made. A lower Si content is effective to prevent the production of the deleterious δ ferrite structure, and to prevent the degradation of the toughness of the ferritic steel attributed to grain-boundary segregation, etc. Accordingly, the addition of the constituent Si needs to be suppressed to 0.15 (%) or below. The Si content of the ferritic steel should desirably be at most 0.07 (%), and should particularly preferably be less than 0.04 (%).

The constituent Ni (nickel) is an element which is very effective to heighten the toughness and to prevent the production of the δ ferrite. The addition of the element Ni at a level of less than 0.05 (%) is unfavorable because it has an insufficient effect, and the addition thereof at more than 1.0 (%) is also unfavorable because of degradation in the creep rupture strength. Especially, a range of 0.3–0.7 (%) is preferable, and a range of 0.4–0.65 (%) is more preferable.

The constituent Cr (chromium) is an element which is indispensable to enhancing the high-temperature strength and high-temperature oxidation resistance of the ferritic steel. The element Cr is required at least 9 (%). However, when the Cr content exceeds 13 (%), the deleterious δ ferrite structure is produced, which lowers the high-temperature strength and the toughness. Therefore, the Cr content is restricted to within 9–12 (%). Especially, a range of 10–12 (%) is preferable, and a range of 10.8–11.8 (%) is more preferable.

The addition of the constituent Mo (molybdenum) is intended to enhance the high-temperature strength. However, in a case where the constituent W (tungsten) is contained at a level of more than 1 (%), as in the steel of the present invention, Mo addition at a level of exceeding 0.5 (%) lowers the toughness and fatigue strength of the ferritic steel. Therefore, the Mo content is limited to, at most, 0.5 (%). Especially, a range of 0.05–0.45 (%) is preferable, and a range of 0.1–0.2 (%) is more preferable.

The constituent W (tungsten) suppresses the coarsening of carbides due to the agglomerations thereof at high temperatures, and it turns the matrix of the ferritic steel into a solid solution and strengthens this matrix. It is therefore effective to remarkably enhance the long-term strength of the ferritic steel at the high temperatures of at least 620 (°C.). The W content of the ferritic steel should preferably be 1–1.5 (%) at 620 (°C.), 1.6–2.0 (%) at 630 (°C.), 2.1–2.5 (%) at 640 (°C.), 2.6–3.0 (%) at 650 (°C.) and 3.1–3.5 (%) at 660 (°C.). Besides, when the W content exceeds 3.5 (%), the δ ferrite is produced, which lowers the toughness. Therefore, the W content is restricted to within 1–3.5 (%). Especially, a range of 2.4–3.0 (%) is preferable, and a range of 2.5–2.7 (%) is more preferable.

The constituent V (vanadium) is effective to heighten the creep rupture strength by precipitating the carbonitrides of this constituent V. When the V content of the ferritic steel is less than 0.05 (%), the effect is insufficient. On the other hand, when the V content exceeds 0.3 (%), the δ ferrite is produced, which lowers the fatigue strength. Especially, a range of 0.10–0.25 (%) is preferable, and a range of 0.15–0.23 (%) is more preferable.

The constituent Nb (niobium) is an element which is very effective to precipitate NbC (niobium carbide) and enhance the high-temperature strength. However, when the element Nb is added in an excessively large amount, the coarse grains of eutectic NbC appear, especially in a large-sized steel ingot, which causes significant lowering of the strength and precipitation of the δ ferrite, which lowers the fatigue strength. It is therefore necessary to suppress the amount of the element Nb to 0.20 (%) or below. On the other hand, when the Nb amount is less than 0.01 (%), the effect is insufficient. Especially, a range of 0.02–0.15 (%) is preferable, and a range of 0.04–0.10 (%) is more preferable.

The constituent Co (cobalt) is an important element, and is a feature which distinguishes the present invention from the prior-art techniques. In the present invention, owing to the addition of the element Co, the high-temperature strength is remarkably improved, and the toughness is also heightened.

These effects are considered to be based on the interaction between the elements Co and W, and they are the characterizing phenomena of the alloy of the present invention containing the element W in the amount of at least 1 (%). In order to realize such effects of the element Co, the lower limit of the Co amount in the alloy of the present invention is set at 2.0 (%) On the other hand, even when the element Co is added in excess, greater effects are not attained, and moreover, the ductility of the ferritic steel is lowered. Therefore, the upper limit of the Co amount is set at 10 (%). The Co amount should desirably be 2–3 (%) for 620 (°C.), 3.5–4.5 (%) for 630 (°C.), 5–6 (%) for 640 (°C.), 6.5–7.5 (%) for 650 (°C.), and 8–9 (%) for 660 (°C.).

The constituent N (nitrogen) is also an important element and is a feature which distinguishes the present invention from the prior-art techniques. The element N is effective to improve the creep rupture strength and to prevent the production of the δ ferrite structure. However, when the N content of the ferritic steel is less than 0.01 (%), the effects are not sufficient. On the other hand, when the N content exceeds 0.05 (%), the toughness is lowered, and the creep rupture strength is also lowered. Especially, a range of 0.01–0.03 (%) is preferable, and a range of 0.015–0.025 (%) is more preferable.

The constituent B (boron) is effective to enhance the high-temperature strength by the action of intensifying grain boundaries, and the action of turning into solid solutions in carbides $M_{23}C_6$ to hinder the $M_{23}C_6$ type carbides from coarsening due to the agglomerations thereof. It is effective to add the constituent B to a level in excess of 0.001 (%). However, when the B content exceeds 0.03 (%), the weldability and forgeability of the ferritic steel are degraded. Therefore, the B content is limited to within 0.001–0.03 (%). It should desirably be 0.001–0.01 (%) or 0.01–0.02 (%).

The addition of the constituent/constituents Ta (tantalum), Ti (titanium) or/and Zr (zirconium) is effective to heighten the toughness. A sufficient effect is attained by adding at most 0.15 (%) of Ta, at most 0.1 (%) of Ti or/and at most 0.1 (%) of Zr singly or in combination. In a case where the constituent Ta is added at a level of 0.1 (%) or above, the addition of the constituent Nb (niobium) can be omitted.

The rotor shaft and, at least, the first-stage ones of the moving blades and fixed blades in the present invention should preferably be made for a steam temperature of 620–630 (°C.) out of steel of fully-tempered martensitic structure which contains 0.09–0.20 (%) of C, at most 0.15

(%) of Si, 0.05–1.0 (%) of Mn, 9.5–12.5 (%) of Cr, 0.1–1.0 (%) of Ni, 0.05–0.30 (%) of V, 0.01–0.06 (%) of N, 0.05–0.5 (%) of Mo, 2–3.5 (%) of W, 2–4.5 (%) of Co, 0.001–0.030 (%) of B, and at least 77 (%) of Fe (iron). Besides, they should preferably be made for a steam temperature of 635–660 (°C.) out of steel of fully-tempered martensitic structure in which the aforementioned Co content is replaced with 5–8 (%), and which contains at least 78 (%) of Fe. Especially, a high strength is attained by decreasing the Mn content to 0.03–0.2 (%) and the B content to 0.001–0.01 (%) for both the aforementioned temperatures. The martensitic steel should particularly preferably contain 0.09–0.20 (%) of C, 0.1–0.7 (%) of Mn, 0.1–1.0 (%) of Ni, 0.10–0.30 (%) of V, 0.02–0.05 (%) of N, 0.05–0.5 (%) of Mo, and 2–3.5 (%) of W, along with 2–4 (%) of Co and 0.001–0.01 (%) of B for a temperature of or below 630 (°C.) or 5.5–9.0 (%) of Co and 0.01–0.03 (%) of B for a temperature of 630–660 (°C.).

The Cr equivalent which is obtained by the formula mentioned before is set at 4–10.5 for the rotor shafts of the high-pressure and intermediate-pressure steam turbines, and a range of 6.5–9.5 is particularly preferable therefor. The same applies to the other components of these steam turbines stated before.

Regarding the rotor material of the high-pressure and intermediate-pressure steam turbines of the present invention, the fatigue strength and the toughness lower due to the coexistence of the δ ferrite structure. Therefore, the tempered martensitic structure which is homogeneous, is favorable for the heat-resisting ferritic steel. In order to obtain the tempered martensitic structure, the Cr equivalent which is computed by the formula mentioned before must be set at, at most, 10 by controlling the alloy contents. On the other hand, when the Cr equivalent is too small, it lowers the creep rupture strength, and hence, it must be set at, at least, 4. Especially, a range of 5–8 is preferable as the Cr equivalent.

Regarding each of the rotors in the present invention, alloying raw materials to be brought into the desired composition are melted in an electric furnace, the molten materials are deoxidized by carbon vacuum deoxidation, the deoxidized materials are cast into a metal mold, and the molded article is forged into an electrode. The electrode thus fabricated is subjected to electroslag remelting, and the resulting slag is forged and formed into the shape of the rotor. The forging must be carried out at a temperature of 1150 (°C.) or below in order to prevent forging cracks. After the forged steel has been annealed, it is heated to 1000–1100 (°C.) and then quenched, and it is tempered twice in the sequence of a temperature range of 550–650 (°C.) and a temperature range of 670–770 (°C.). Thus, the steam turbine rotor which is usable in steam at or above 620 (°C.) can be manufactured.

Regarding each of the components in the present invention, which includes the blades, nozzles and innercasing tightening bolts of the high-pressure and intermediate-pressure steam turbines, and the first-stage diaphragm of the intermediate-pressure portion, an ingot is prepared in such a way that the alloying raw materials to be brought into the desired composition are melted by vacuum melting, and that the molten materials are cast in a metal mold in vacuum. The ingot is hot-forged into a predetermined shape at the same temperature as stated before. After the forged ingot has been heated to 1050–1150 (°C.), it is subjected to water cooling or oil quenching. Subsequently, the resulting ingot is tempered in a temperature range of 700–800 (°C.), and it is machined into the component of desired shape. The vacuum melting is carried out under a vacuum condition of $10^{-1}$–$10^{-4}$ (mmHg). In particular, although the heat-resisting steel in the present invention can be applied to all the stages of the blades and nozzles of the high-pressure portion and intermediate-pressure portion, they are especially necessary for the first stages of both the sorts of component.

The steam-turbine rotor shaft made of the 12 weight-% Cr type martensitic steel in the present invention should preferably be so constructed that buildup welding layers of good bearing characteristics are formed on the surface of the parent metal forming each journal portion of the rotor shaft. More specifically, the buildup welding layers are formed in the number of 5–10 by the use of a weld metal being steel. The Cr content of the steel as the weld metal is lowered successively from the first layer to any of the second–fourth layers, whereas the layers of and behind the fourth layer are formed of the steel having an identical Cr content. Herein, the Cr content of the weld metal for the deposition of the first layer is rendered about 2–6 (weight-%) less than that of the parent metal, and the Cr contents of the welding layers of and behind the fourth layer are set at 0.5–3 (weight-%), preferably at 1–2.5 (weight-%).

In the present invention, the buildup welding is favorable for the improvement of the bearing characteristics of the journal portion in view of the highest safety, but it becomes very difficult due to increase in the B content of the steel. Therefore, in the case where the B content is set at 0.02 (%) or above in order to attain a higher strength, it is recommended to adopt a construction in which the journal portion is inserted into a sleeve made of low-alloy steel having a Cr content of 1–3 (%), through shrinkage fit. The material composition of the sleeve is the same as that of the buildup welding layers to be explained later.

The buildup welding layers according to the method of the present invention need to be in the number of 5–10. Abrupt decrease in the amount of Cr in the first welding layer causes the development of high residual tensile stress or welding cracks, so that the Cr content of the weld metal of the first welding layer cannot be sharply lowered. As stated before, therefore, the Cr contents need to be gradually lowered with the enlarged number of welding layers. Further, since the desired Cr content and a desired thickness need to be held as the surface layer of the journal portion, the welding layers need to be in the number of 5 or more. By the way, even when the number of welding layers is larger than 10, no greater effect is achieved. Regarding a large-sized structural member such as the steam-turbine rotor shaft, the buildup welding layers must not have their composition influenced by the parent metal and need to be endowed with the desired composition as well as the desired thickness. Herein, three layers are required as a thickness for preventing the influence of the parent metal. Besides, layers of desired characteristics need to be stacked on the three layers to a desired thickness, and at least two layers are required as the desired thickness. By way of example, a thickness of about 18 (mm) is required as the desired thickness of the finally finished buildup welding layers. In order to form such a thickness, at least five buildup welding layers are necessitated even when a final finish margin to be machined is excluded. The third layer et seq. should preferably be mainly made of the tempered martensitic structure from which the carbides have been precipitated. Especially, the composition of the fourth welding layer et seq. should preferably contain in terms of weight, 0.01–0.1 (%) of C, 0.3–1 (%) of Si, 0.3–1.5 (%) of Mn, 0.5–3 (%) of Cr and 0.1–1.5 (%) of Mo, the balance being Fe.

Moreover, in the buildup welding layers, the Cr content is lowered successively from the first layer to any of the second–fourth layers. In performing the buildup welding, welding rods whose Cr contents are gradually lowered are used for the respective layers. Then, the buildup welding layers of the desired composition can be formed without incurring the problem of lowered ductility or welding cracks of the first-layer welding zone attributed to the sharp decrease of the chromium content in the first-layer welding zone. In this way, the present invention can form the buildup welding layers in which the chromium contents in the vicinities of the parent metal and the first-layer zone do not exhibit a very large difference, and in which the final layer has the good bearing characteristics as stated above.

The weld metal which is applied to the first-layer welding has its chromium content rendered about 2–6 (weight-%) lower than the chromium content of the parent metal. When the Cr content of the weld metal is less than 2 (%) that of the parent metal, the pertinent Cr content of the buildup welding layer cannot be lowered sufficiently, and the effect is slight. To the contrary, when the value exceeds 6 (%), the Cr content of the buildup welding layer lowers suddenly from that of the parent metal, and the difference between the Cr contents gives rise to a large difference between the coefficients of thermal expansion of both the metals, to thereby cause development of high residual tensile stress or welding cracks. Incidentally, since a higher Cr content results in a smaller coefficient of thermal expansion, the buildup welding layer of lower Cr content has larger coefficient of thermal expansion than the parent metal and is formed with the high residual tensile stress by the welding. Therefore, the welding with steel of still lower Cr content produces a hard layer due to the high residual stress and causes development of welding cracks. Accordingly, the Cr content of the weld metal needs to be set at, at most, 6 (%) smaller than that of the parent metal. Owing to the use of such a weld metal, the chromium content of the first-layer welding layer becomes lower than that of the parent metal by as little as about 1–3 (%) because the weld metal mixes with the parent metal. Thus, favorable welding is attained.

In the method of the present invention, the layers of and behind the fourth layer need to be formed using weld metal which is made of steel having an identical Cr content. In the buildup welding, the buildup welding layers up to the third layer are influenced by the composition of the parent metal. Since, however, the fourth buildup welding layer et seq. are composed only of the employed weld metal without this influence, they can be formed to satisfy the characteristics required for the journal portion of the steam-turbine rotor shaft. Besides, as stated before, the thickness of the buildup welding layers required for the large-sized structural member operating as the steam-turbine rotor shaft is about 18 (mm). Accordingly, in order to ensure the alloying constituents required for the final layer and the sufficient thickness required in the case of the constituents, two or more layers are deposited as the fourth layer et seq. by the use of the weld metal having the same Cr content. Thus, the final layer which satisfies the characteristics required for the journal portion as stated before can be formed having the sufficient thickness.

(2) There will be elucidated the reasons for restricting the constituents of the heat-resisting ferritic steel which is used in the present invention for making the inner casings, control-valve valve casings, combinational-reheater-valve valve casings, main-steam leading pipes, main-steam inlet pipes and reheat-steam inlet pipes of the high-pressure and intermediate-pressure steam turbines, the nozzle box of the high-pressure turbine, the first-stage diaphragm of the intermediate-pressure turbine, and the main-steam inlet flange and elbow and the main-steam stop valve of the high-pressure turbine:

In the casing material of the heat-resisting ferritic cast steel, especially, the Ni/W ratio is controlled to 0.25–0.75, thereby obtaining the casing material of the heat-resisting cast steel which meets a 625-°C. $10^5$-h creep rupture strength of at least 9 (kgf/mm$^2$) and a room-temperature absorbed impact energy of at least 1 (kgf-m) that are required of the high-pressure and intermediate-pressure inner casings, main-steam stop valve and control valve casing of the turbine under the ultra-supercritical pressure of at least 250 (kgf/cm$^2$) at 621 (°C.).

In the heat-resisting cast steel of the present invention used as the casing material, the Cr equivalent which is computed in terms of the alloy contents (weight-%) of the following formula should preferably be controlled so as to become 4–10, in order to attain a superior high-temperature strength, a superior low-temperature toughness and a high fatigue strength:

$$Cr\ equivalent = Cr + 6Si + 4Mo + 1.5W + 11V + 5Nb - 40C - 30N - 30B - 2Mn - 4Ni - 2Co$$

Since the 12Cr heat-resisting steel of the present invention is used in the steam at or above 621 (°C.), it must be endowed with the 625-°C. $10^5$-h creep rupture strength of at least 9 (kgf/mm$^2$) and the room-temperature absorbed impact energy of at least 1 (kgf-m). Further, in order to ensure a still higher reliability, this steel should preferably be endowed with a 625-°C. $10^5$-h creep rupture strength of at least 10 (kgf/mm$^2$) and a room-temperature absorbed impact energy of at least 2 (kgf-m).

The constituent C (carbon) is an element which is required at a level of at least 0.06 (%) in order to attain a high tensile strength. However, in a case where the C content exceeds 0.16 (%), the steel comes to have an unstable metallographic structure and degraded the long-time creep rupture strength thereof when exposed to high temperatures for a long time period. Therefore, the C content is restricted to within 0.06–0.16 (%). It should preferably be within 0.09–0.14 (%).

The constituent N (nitrogen) is effective to improve the creep rupture strength and to prevent the production of the δ ferrite structure. However, when the N content of the steel is less than 0.01 (%), the effects are not sufficient. On the other hand, even when the N content exceeds 0.1 (%), no remarkable effects are attained. Moreover, the toughness is lowered, and the creep rupture strength is also lowered. Especially, a range of 0.02–0.1 (%) is preferable.

The constituent Mn (manganese) is added for a deoxidizer, and the effect thereof is achieved by a small amount of addition. A large amount of addition exceeding 1 (%) is unfavorable because it lowers the creep rupture strength. Especially, a range of 0.4–0.7 (%) is preferable.

The constituent Si (silicon) is also added as a deoxidizer, but the Si deoxidation is dispensed with when the steelmaking technique employed is vacuum C deoxidation or the like. A lower Si content is effective to prevent the production of the deleterious δ ferrite structure. Accordingly, the addition of the constituent Si needs to be suppressed to 0.5 (%) or below. The Si content of the steel should preferably be 0.1–0.4 (%).

The constituent V (vanadium) is effective to heighten the creep rupture strength. When the V content of the steel is less than 0.05 (%), the effect is insufficient. On the other hand, when the V content exceeds 0.35 (%), the δ ferrite is produced which lowers the fatigue strength. Especially, a range of 0.15–0.25 (%) is preferable.

The constituent Nb (niobium) is an element which is very effective to enhance the high-temperature strength. However, when the element Nb is added in an excessively large amount, the coarse grains of eutectic NbC (niobium carbide) appear especially in a large-sized steel ingot, to thereby cause substantial lowering of the strength and precipitation of the δ ferrite which lowers the fatigue strength. It is therefore necessary to suppress the amount of the element Nb to 0.15 (%) or below. On the other hand, when the Nb amount is less than 0.01 (%), the effect is insufficient. Especially in the case of the large-sized steel ingot, a range of 0.02–0.1 (%) is preferable, and a range of 0.04–0.08 (%) is more preferable.

The constituent Ni (nickel) is an element which is very effective to heighten the toughness and to prevent the production of the δ ferrite. The addition of the element Ni at a level of less than 0.2 (%) is unfavorable because of insufficient effects, and the addition thereof at the level of more than 1.0 (%) is also unfavorable because of degradation in the creep rupture strength. Especially, a range of 0.4–0.8 (%) is preferable.

The constituent Cr (chromium) is effective to improve the high-temperature strength and high-temperature oxidation resistance of the 12Cr steel. Herein, a Cr content exceeding 12 (%) causes production of the deleterious δ ferrite structure, and a Cr content below 8 (%) results in an insufficient oxidation resistance to the high-temperature high-pressure steam. Besides, the addition of the element Cr is effective to enhance the creep rupture strength. However, the Cr addition in an excessive amount causes production of the deleterious δ ferrite structure and for lowering of the toughness. Especially, a range of 8.0–10 (%) is preferable, and a range of 8.5–9.5 (%) is more preferable.

The constituent W (tungsten) is effective to remarkably enhance the high-temperature long-term strength of the 12Cr steel. When the amount of the element W is smaller than 1 (%), the effect is insufficient as the heat-resisting steel which is used at 620–620 (°C.). On the other hand, when the amount of the element W exceeds 4 (%), the toughness is lowered. The W content of the steel should preferably be 1.0–1.5 (%) at 620 (°C.), 1.6–2.0 (%) at 630 (°C.), 2.1–2.5 (%) at 640 (°C.), 2.6–3.0 (%) at 650 (°C.) and 3.1–3.5 (%) at 660 (°C.).

The constituents W and Ni correlate with each other. The 12Cr steel whose strength and toughness are both superior, can be obtained by setting the Ni/W ratio at 0.25–0.75.

The addition of the constituent Mo (molybdenum) is intended to enhance the high-temperature strength. However, in a case where the constituent W (tungsten) is contained at a level of more than 1 (%) as in the cast steel of the present invention, the Mo addition exceeding 1.5 (%) lowers the toughness and fatigue strength of the steel. Therefore, the Mo content is recommended to be at most 1.5 (%). Especially, a range of 0.4–0.8 (%) is preferable, and a range of 0.55–0.70 (%) is more preferable.

The addition of the constituent/constituents Ta (tantalum), Ti (titanium) or/and Zr (zirconium) is effective to heighten the toughness. A sufficient effect is attained by adding at most 0.15 (%) of Ta, at most 0.1 (%) of Ti or/and at most 0.1 (%) of Zr singly or in combination. In a case where the constituent Ta is added at a level of 0.1 (%) or above, the addition of the constituent Nb (niobium) can be omitted.

Regarding the heat-resisting cast steel of the present invention which is used as the casing material, the fatigue strength and the toughness are lowered due to the coexistence of the δ ferrite structure. Therefore, the tempered martensitic structure which is homogeneous is favorable. In order to obtain the tempered martensitic structure, the Cr equivalent which is computed by the formula mentioned before must be set at, at most, 10 by controlling the alloy contents. On the other hand, when the Cr equivalent is too small, it lowers the creep rupture strength, and hence, it must be set at 4 or above. Especially, a range of 6–9 is preferable as the Cr equivalent.

The addition of the constituent B (boron) remarkably enhances the high-temperature (620 (°C.) or above) creep rupture strength of the steel. Herein, when the B content of the steel exceeds 0.003 (%), the weldability thereof worsens. Therefore, the upper limit of the B content is set at 0.003 (%). Especially, the upper limit of the B content of the large-sized casing should preferably be set at 0.0028 (%). Further, a range of 0.0005–0.0025 (%) is preferable, and a range of 0.001–0.002 (%) is particularly preferable.

Since the casing covers the high-pressure steam at temperatures of at least 620 (°C.), it undergoes a high stress ascribable to the internal pressure thereof. From the viewpoint of preventing the creep rupture of the casing, therefore, the $10^5$-h creep rupture strength of at least 10 (kgf/mm$^2$) is required of the steel. Moreover, during the starting operation of the turbine, the casing undergoes a thermal stress at the time of a low metal temperature. From the viewpoint of preventing the brittle fracture of the casing, therefore, the room-temperature absorbed impact energy of at least 1 (kgf-m) is required of the steel. For the higher temperature side of the steam, the steel can be strengthened by containing at most 10 (%) of Co (cobalt). Especially, the Co content should preferably be 1–2 (%) for 620 (°C.), 2.5–3.5 (%) for 630 (°C.), 4–5 (%) for 640 (°C.), 5.5–6.5 (%) for 650 (°C.), and 7–8 (%) for 660 (°C.).

In fabricating the casing having few defects, a high degree of manufacturing technology is required because the casing is a large-sized structural member whose ingot has a weight of about 50 (tons). As the casing material of the heat-resisting ferritic cast steel in the present invention, a satisfactory one can be prepared in such a way that alloying raw materials to be brought into the desired composition are melted by an electric furnace and then refined by a ladle, and that the resulting raw materials are thereafter cast into a sand mold. The cast steel in which casting defects such as shrinkage holes are involved in small numbers, can be obtained by sufficiently refining and deoxidizing the raw materials before the casting.

After the cast steel has been annealed at 1000–1150 (°C.), it is normalized by heating it to 1000–1100 (°C.) and then quenching it. Subsequently, the resulting steel is tempered twice in the sequence of a temperature range of 550–750 (°C.) and a temperature range of 670–770 (°C.). Thus, the steam turbine casing which is usable in the steam at or above 620 (°C.) can be manufactured. When the annealing and normalizing temperatures are below 1000 (°C.), carbonitrides cannot be sufficiently turned into a solid solution, and when they are excessively high, grain coarsening is caused. Besides, the two tempering operations decompose retained austenite entirely, so that the steel can be rendered the tempered martensitic structure which is homogeneous. Owing to the above method of preparation, the 625-°C. $10^5$-h creep rupture strength of at least 10 (kgf/mm$^2$) and the room-temperature absorbed impact energy of at least 1 (kgf-m) are attained, and the prepared steel can be fabricated into the steam turbine casing which is usable in steam at or above 620 (°C.).

The casing material in the present invention is set at the Cr equivalent stated before, and the δ ferrite content thereof should preferably be 5 (%) or less, and more preferably 0 (%).

Except for the inner casing for the intermediate-pressure steam turbine, which is made of cast steel, the components mentioned before should preferably be made of forged steel.

(3) Others:
  (a) The rotor shaft of the low-pressure steam turbine should preferably be made of low-alloy steel having a fully-tempered bainitic structure which contains in terms of weight, 0.2–0.3 (%) of C, at most 0.1 (%) of Si, at most 0.2 (%) of Mn, 3.2–4.0 (%) of Ni, 1.25–2.25 (%) of Cr, 0.1–0.6 (%) of Mo and 0.05–0.25 (%) of V. The low-alloy steel should preferably be manufactured by the same manufacturing method as the ferritic steel of the high-pressure and intermediate-pressure rotor shafts, as explained before. Especially, the manufacture should preferably be a superclean (highly pure) one employing raw materials which contain at most 0.05 (%) of Si and at most 0.1 (%) of Mn, and in which impurities such as P, S, As, Sb and Sn are decreased to the utmost so as to amount to 0.025 (%) or less in total. It is favorable that each of the P and S contents of the raw materials is at most 0.010 (%), that each of the Sn and As contents is at most 0.005 (%), and that the Sb content is at most 0.001 (%).

(b) Blades for the low-pressure turbine except a final-stage moving one, and nozzles therefor should preferably be made of fully-tempered martensitic steel which contains 0.05–0.2 (%) of C, 0.1–0.5 (%) of Si, 0.2–1.0 (%) of Mn, 10–13 (%) of Cr and 0.04–0.2 (%) of Mo.

(c) Both inner and outer casings for the low-pressure turbine should preferably be made of cast carbon steel which contains 0.2–0.3 (%) of C, 0.3–0.7 (%) of Si and at most 1 (%) of Mn.

(d) The casings of a main-steam stop valve and a steam control valve for the low-pressure turbine should preferably be made of fully-tempered martensitic steel which contains 0.1–0.2 (%) of C, 0.1–0.4 (%) of Si, 0.2–1.0 (%) of Mn, 8.5–10.5 (%) of Cr, 0.3–1.0 (%) of Mo, 1.0–3.0 (%) of W, 0.1–0.3 (%) of V, 0.03–0.1 (%) of Nb, 0.03–0.08 (%) of N and 0.0005–0.003 (%) of B.

(e) A Ti alloy is employed for the final-stage moving blade of the low-pressure turbine. More specifically, the Ti alloy contains 5–8 (weight-%) of Al and 3–6 (weight-%) of V for the length of the final-stage moving blade exceeding 40 (inches), and these contents can be increased with the length. Especially, a high-strength material containing 5.5–6.5 (%) of Al and 3.5–4.5 (1) of V is preferable for the length of 43 (inches), and a high-strength material containing 4–7 (%) of Al, 4–7 (%) of V and 1–3 (%) of Sn for the length of 46 (inches).

(f) Outer casings for the high-pressure and intermediate pressure steam turbines should preferably be fabricated of cast steel of fully-tempered bainitic structure which contains 0.05–0.2 (%) of C, 0.05–0.5 (%) of Si, 0.1–1.0 (%) of Mn, 0.1–0.5 (%) of Ni, 1–2.5 (%) of Cr, 0.5–1.5 (%) of Mo and 0.1–0.3 (%) of V, and which favorably contains at least either of 0.001–0.01 (%) of B and at most 0.2 (%) of Ti.

BRIEF DESCRIPTION OF THE DRAWINGS

FIG. 12 is a table (Table 1) exemplifying the specifications of a boiler which is operated under specified steam conditions.

FIG. 13 is a table (Table 2) indicating the specifications of a steam turbine which is operated under specified conditions.

FIG. 14 is a table (Table 3) for explaining the alloy contents of steel materials which are employed in the present invention.

FIG. 15 is a table (Table 4) for explaining the mechanical properties and heat treatment conditions of the steel materials which are listed in Table 3.

FIG. 16 is a table (Table 5) indicating the chemical constituents of welding rods which were used in buildup welding.

FIG. 17 is a table (Table 6) indicating those welding rods in Table 5 which were used in the respective layers of the buildup welding.

FIG. 18 is a table (Table 7) for explaining the strengths of the rotor shaft and blade materials (in FIG. 7) according to the present invention.

FIG. 19 is a table (Table 8) indicating the chemical constituents of inner casing materials according to the present invention.

FIG. 20 is a table (Table 9) indicating the test results of the inner casing materials (in FIG. 19) according to the present invention.

PREFERRED EMBODIMENTS OF THE INVENTION (Embodiment 1)

Due to sudden rises in the prices of fuel after the Oil crisis, a pulverized-coal direct-fired boiler and a steam turbine at steam temperatures of 600–649 (°C.) have been required in order to increase thermal efficiencies on the basis of enhanced steam conditions. One example of the boiler which is operated under such steam conditions, is indicated in Table 1 of FIG. 12.

Since steam oxidation is attendant upon such a higher-temperature operation, 8–10-% Cr steel is employed instead of conventional 2.25-% Cr steel. Besides, since the maximum sulfur content and the maximum chlorine content become 1 (%) and 0.1 (%), respectively, regarding high-temperature corrosion ascribable to pulverized-coal direct-firing gas, an austenitic stainless steel pipe functioning as a superheater tube is made of a material which contains 20–25 (%) of Cr and 20–35 (%) of Ni, which contains Al and Ti in very small amounts of at most 0.5 (%), and 0.5–3 (%) of Mo, and which more preferably contains at most 0.5 (%) of Nb. Pulverized-coal direct firing becomes high-temperature burning. Accordingly, it is desirable, from the view point of decreasing nitrogen oxides $NO_x$, to employ a burner which makes flames of higher temperatures by feeding inner peripheral air and secondary outer peripheral air that form burning flames based on the primary air and pulverized coal, and also reducing flames around the burning flames.

The pulverized-coal fired boiler becomes larger in size as its capacity enlarges. The boiler has a width of 31 (m) and a depth of 16 (m) in the class of 1050 (MW), and a width of 34 (m) and a depth of 18 (m) in the class of 1400 (MW).

Table 2 in FIG. 13 indicates the main specifications of a steam turbine plant which has an output of 1050 (MW) and a steam temperature of 625 (°C.). In this embodiment, a cross-compound type 4-flow exhaust system is adopted, and a final-stage blade in each of the low-pressure turbines (LP's) is 43 (inches) long. An HP (high-pressure turbine)— IP (intermediate-pressure turbine) connection has a rotational speed of 3600 (r/min), while the two LP's have a rotational speed of 1800 (r/min). In a high-temperature portion, components are made of principal materials which are listed in the table. The high-pressure portion (HP) undergoes the steam temperature of 625 (°C.) and a pressure of 250 (kg/cm$^2$). The intermediate-pressure portion (IP) has its steam heated to 625 (°C.) by a reheater (R/H), and is operated under a pressure of 170–180 (kg/cm$^2$). Steam enters the low-pressure portions (LP's) at a temperature of 450 (°C.), and it is sent to a condenser at a temperature of at most 100 (°C.) and in a vacuum of 722 (mmHg).

Figure 1:
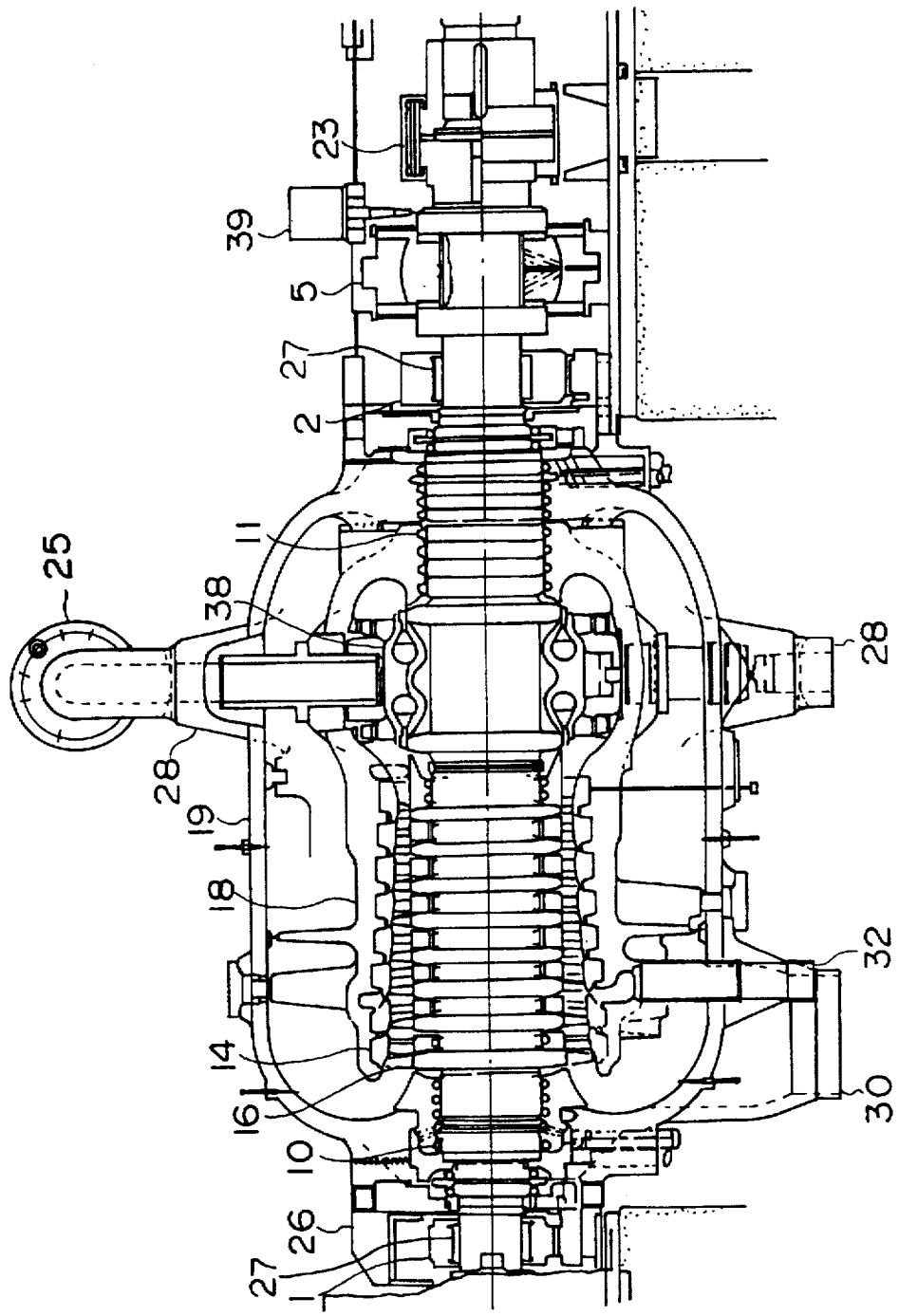
FIG. 1 is a sectional design view of a high-pressure steam turbine made of ferritic steel according to the present invention.

FIG. 1 is a sectional design view of the high-pressure steam turbine. This high-pressure steam turbine is provided with a high-pressure rotor shaft 23 on which high-pressure moving blades 16 are assembled in a high-pressure inner casing 18 and a high-pressure outer casing 19 surrounding the inner casing 18. The steam at the high temperature and under the high pressure as stated before is generated by the boiler explained before. The generated steam is passed through a main steam pipe and then through a main steam inlet 28 defined by a flange and elbow 25, whereupon it is guided to the moving blades 16 of the double-flow first stage from a nozzle box 38. The first stage has the double-flow construction, and eight other stages are disposed on each of the two sides of the high-pressure steam turbine along the rotor shaft 23. Fixed blades are respectively provided in correspondence with the moving blades 16. The moving blades 16 are double-tenon type tangential entry dovetail blades, and the first-stage blade is about 35 (mm) long. The length of the rotor shaft 23 between the centers of bearings 1 and 2 is about 5.25 (m), and the smallest diameter part of this rotor shaft corresponding to the fixed blades has a diameter of about 620 (mm), so that the ratio of the length to the diameter is about 8.5.

The widths of those parts of the rotor shaft 23 on which the moving blades 16 are assembled are substantially equal at the first stage and final stage, and they become smaller toward the downstream side of the steam stepwise at the five types stages, namely the first stage, second stage, third–fifth stages, sixth stage and seventh–eighth stages. The axial width of the assembled part of the second stage is 0.64 times as wide as that of the assembled part of the final stage.

Those parts of the rotor shaft 23 which correspond to the fixed blades are smaller in diameter than those parts thereof on which the moving blades 16 are assembled. The axial widths of the parts corresponding to the fixed blades become smaller stepwise from the width between the second-stage moving blade and the third-stage moving blade, to the width between the final-stage moving blade and the penultimate-stage moving blade, the latter width being 0.86 times as wide as the former width. Concretely, the axial widths of the parts corresponding to the fixed blades become smaller at the second–sixth stages and the sixth–ninth stages.

In this embodiment, the blades and nozzles of the first stage are made of materials indicated in Table 3 of FIG. 14 to be explained later, whereas those of all the other stages are made of 12-% Cr steel which contains no W, Co or B. The blade parts of the 0moving blades 16 in this embodiment are 35–50 (mm) long at the first stage, and become longer at the respective stages from the second stage toward the final stage.

Especially, the lengths of the blade parts of the second–final stages are set at 65–210 (mm), depending upon the output of the steam turbine. The number of the stages is 9–12. Herein, the lengths of the blade parts at the respective stages increase at ratios of 1.10–1.15 in terms of the lengths of the downstream-side blade parts adjoining the upstream-side ones, and the ratios gradually enlarge on the downstream side.

As stated above, those parts of the rotor shaft 23 on which the moving blades 16 are assembled are larger in diameter compared with those parts thereof which correspond to the fixed blades. In this regard, the axial widths of the moving-blade assembled parts become larger with the lengths of the blade parts of the moving blades 16. The ratios of the aforementioned axial widths to the lengths of the blade parts of the moving blades 16 are 0.65–0.95 at the second–final stages, and become smaller stepwise from the second stage toward the final stage.

As also stated above, the axial widths of those parts of the rotor shaft 23 which correspond to the fixed blades become smaller stepwise from the width between the second stage and the third stage, to the width between the final stage and the penultimate stage. The ratios of the aforementioned axial widths to the lengths of the blade parts of the moving blades 16 are 0.7–1.7 at the second–final stages, and become smaller stepwise from the upstream-side blade part toward the downstream-side blade part.

The high-pressure steam turbine shown in FIG. 1 further includes a thrust bearing 5, a first shaft packing 10, a second shaft packing 11, a high-pressure spacer 14, a front bearing box 26, a journal portion 27, a high-pressure steam exhaust port 30, a reheat steam inlet 32, and a thrust-bearing wear interrupter 39.

Figure 2:
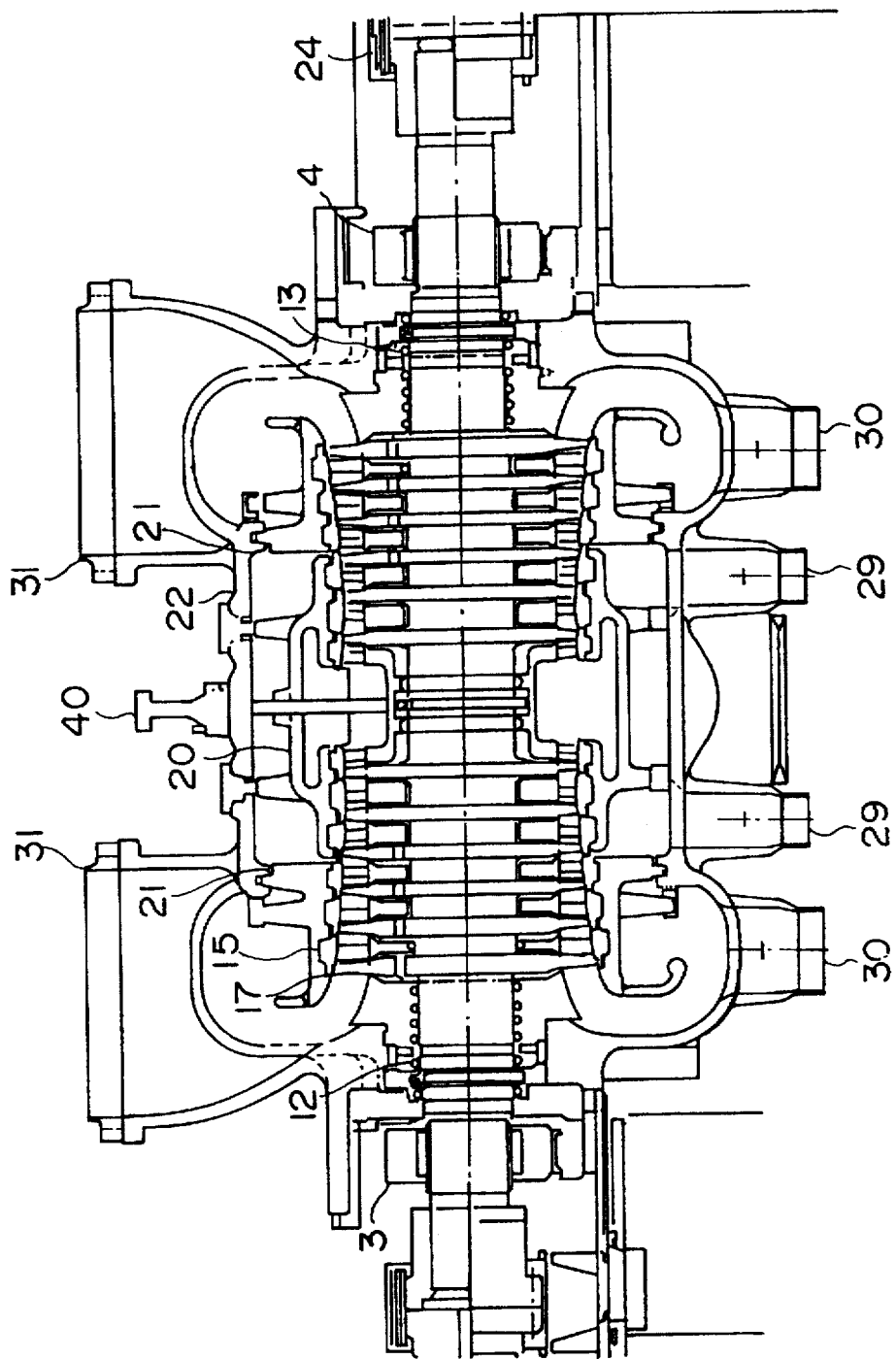
FIG. 2 is a sectional design view of an intermediate-pressure steam turbine made of ferritic steel according to the present invention.

FIG. 2 is a sectional view of the intermediate-pressure steam turbine. This intermediate-pressure steam turbine rotates a generator (G in FIG. 13) conjointly with the high-pressure steam turbine, by the use of steam which is obtained in such a way that steam exhausted from the high-pressure steam turbine is heated again to 625 (°C.) by a reheater (R/H in FIG. 13). Herein, the intermediate-pressure turbine has a rotational speed of 3600 (revolutions/min). Likewise to the high-pressure turbine, the intermediate-pressure turbine includes an intermediate-pressure inner casing 21 and an outer casing 22. It is provided with fixed blades in opposition to intermediate-pressure moving blades 17. The moving blades 17 have a double-flow construction of six stages, and they are disposed in a substantially symmetrical arrangement on both sides of an intermediate-pressure rotor shaft 24 in the lengthwise direction thereof. The distance between the centers of bearings 3 and 4 in which the rotor shaft 24 is journaled, is about 5.5 (m). The moving blade of the first stage has a length of about 92 (mm), and that of the final stage has a length of about 235 (mm). The dovetail of the double-flow construction is in an inverted-chestnut shape. That part of the rotor shaft 24 which corresponds to the fixed blade preceding the final-stage moving blade 17 has a diameter of about 630 (mm), and the ratio of the inter-bearing distance of this rotor shaft to the aforementioned diameter is about 8.7.

The axial widths of those parts of the rotor shaft 24 of the intermediate-pressure steam turbine of this embodiment on which the moving blades 17 are assembled become larger toward the downstream side of the steam stepwise at the three sorts of stages of the first stage, the fourth and fifth stages and the final stage. The axial width of the assembled part of the final stage is about 1.4 times as large as that of the assembled part of the first stage.

Besides, those parts of the rotor shaft 24 of the intermediate-pressure steam turbine which correspond to the fixed blades are smaller in diameter than those parts thereof on which the moving blades 17 are assembled. The axial widths of the parts corresponding to the fixed blades become smaller toward the downstream side of the steam stepwise at the four moving-blade stages of the first stage, second stage, third stage and final stage, and the axial width at the final stage is about 0.7 time as large as the axial width at the first stage.

In this embodiment, the blades and nozzles of the first stage are made of the materials indicated in Table 3 of FIG. 14 to be explained later, whereas those of all the other stages are made of the 12-% Cr steel which contains no W, Co or B. The blade parts of the moving blades 17 in this embodiment become longer at the respective stages from the first stage toward the final stage. The lengths of the blade parts of the first–final stages are set at 90–350 (mm), depending upon the output of the steam turbine. The number of the stages is 6–9. Herein, the lengths of the blade parts at the respective stages increase at ratios of 1.1–1.2 in terms of the lengths of the downstream-side blade parts adjoining the upstream-side ones.

As stated above, those parts of the rotor shaft 24 on which the moving blades 17 are assembled are larger in diameter compared with those parts thereof which correspond to the fixed blades. In this regard, the axial widths of the moving-blade assembled parts become larger with the lengths of the blade parts of the moving blades 17. The ratios of the aforementioned axial widths to the lengths of the blade parts of the moving blades 17 are 0.5–0.7 at the first–final stages, and become smaller stepwise from the first stage toward the final stage.

As also stated above, the axial widths of those parts of the rotor shaft 24 which correspond to the fixed blades become smaller stepwise from the width between the first stage and the second stage, to the width between the final stage and the penultimate stage. The ratios of the aforementioned axial widths to the lengths of the blade parts of the moving blades 17 are 0.5–1.5, and become smaller stepwise from the upstream-side blade part toward the downstream-side blade part.

The intermediate-pressure steam turbine shown in FIG. 2 further includes shaft packings 12 and 13, an intermediate-pressure spacer 15, a first inner casing 20 (associated with the second inner casings 21), reheat steam inlets 29, steam exhaust ports 30, crossover pipes 31, and a warming steam inlet 40.

Figure 3:
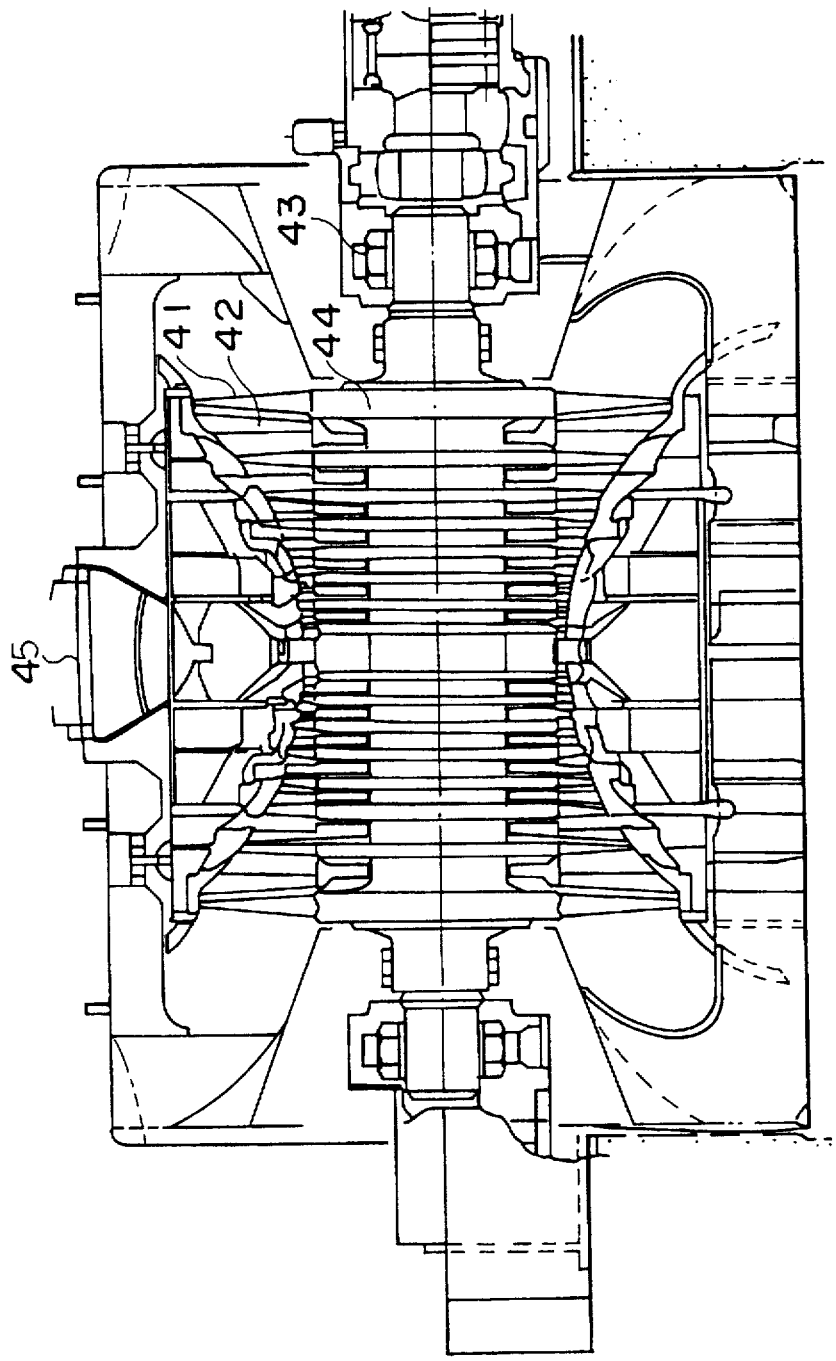
FIG. 3 is a sectional design view of a low-pressure steam turbine according to the present invention.

FIG. 3 is a sectional view of the low-pressure turbine. Two low-pressure turbines are connected in tandem, and they have the same design. Moving blades 41 are provided as eight stages on both sides of a rotor shaft 44 in the lengthwise direction thereof, and these moving blades on both sides are substantially in a bilaterally symmetric arrangement. Besides, fixed blades 42 are disposed in correspondence with the moving blades 41. The moving blade 41 of the final stage is 43 (inches) long, and is made of a Ti-based alloy. The moving blades 41 of all the stages are double-tenon type tangential entry dovetail blades. A nozzle box 45 is of double-flow type.

The Ti-based alloy is subjected to age hardening, and it contains 6 (%) of Al and 4 (%) of V in terms of weight. The rotor shafts 44 are made of forged steel of fully-tempered bainitic structure prepared from superclean materials (high purity materials) which consist of 3.75 (%) of Ni, 1.75 (%) of Cr, 0.4 (%) of Mo, 0.15 (%) of V, 0.25 (%) of C, 0.05 (%) of Si, 0.10 (%) of Mn, and the balance of Fe. All the moving blades and the fixed blades except the final-stage ones are made of 12-% Cr steel containing 0.1 (%) of Mo. Cast steel containing 0.25 (%) of C is employed as the material of the inner and outer casings. The distance between the centers of bearings 43 in this embodiment is 7500 (mm). Those parts of the rotor shaft 44 which correspond to the fixed blades 42 have a diameter of about 1280 (mm), while those parts thereof on which the moving blades 41 are assembled have a diameter of about 2275 (mm). The ratio of the inter-bearing distance to the smaller diameter of the rotor shaft 44 is about 5.9.

In the low-pressure turbine of this embodiment, the axial widths of the moving-blade assembled parts of the rotor shaft 44 gradually enlarge at the five sorts of stages of the first–third stages, the fourth stage, the fifth stage, the sixth–seventh stages and the eighth stage. The width of the final stage is about 2.5 times as large as that of the first stage.

Besides, those parts of the rotor shaft 44 which correspond to the fixed blades 42 are smaller in diameter than those parts thereof on which the moving blades 41 are assembled. The axial widths of the parts corresponding to the fixed blades 42 become larger toward the downstream side of the steam gradually at the three sorts of moving-blade stages of the first stage, the fifth–sixth stages and the seventh stage, and the width at the final stage is about 1.9 times as large as the width at the first stage.

The blade parts of the moving blades 41 in this embodiment become longer at the respective stages from the first stage toward the final stage. The lengths of the blade parts of the first–final stages are set at 90–1270 (mm), depending upon the output of the steam turbine. The number of the stages is 8 or 9. Herein, the lengths of the blade parts at the respective stages enlarge at ratios of 1.3–1.6 in terms of the lengths of the downstream-side blade parts adjoining the upstream-side ones.

As stated above, those parts of the rotor shaft 44 on which the moving blades 41 are assembled are larger in diameter compared with those parts thereof which correspond to the fixed blades 42. In this regard, the axial widths of the moving-blade assembled parts become larger with the lengths of the blade parts of the moving blades 41. The ratios of the aforementioned axial widths to the lengths of the blade parts of the moving blades 41 are 0.15–0.91 at the first–final stages, and become smaller stepwise from the first stage toward the final stage.

Also, the axial widths of those parts of the rotor shaft 44 which correspond to the fixed blades 42 become smaller stepwise from the width between the first stage and the second stage, to the width between the final stage and the penultimate stage. The ratios of the aforementioned axial widths to the lengths of the blade parts of the moving blades 41 are 0.25–1.25, and become smaller stepwise from the upstream-side blade part toward the downstream-side blade part.

Apart from this embodiment, it is also possible to similarly construct a large-capacity power plant of 1000 (MW) class in which steam inlets to a high-pressure steam turbine and an intermediate-pressure steam turbine are at a temperature of 610 (°C.), while steam inlets to two low-pressure steam turbines are at a temperature of 385 (°C.).

Figure 4:
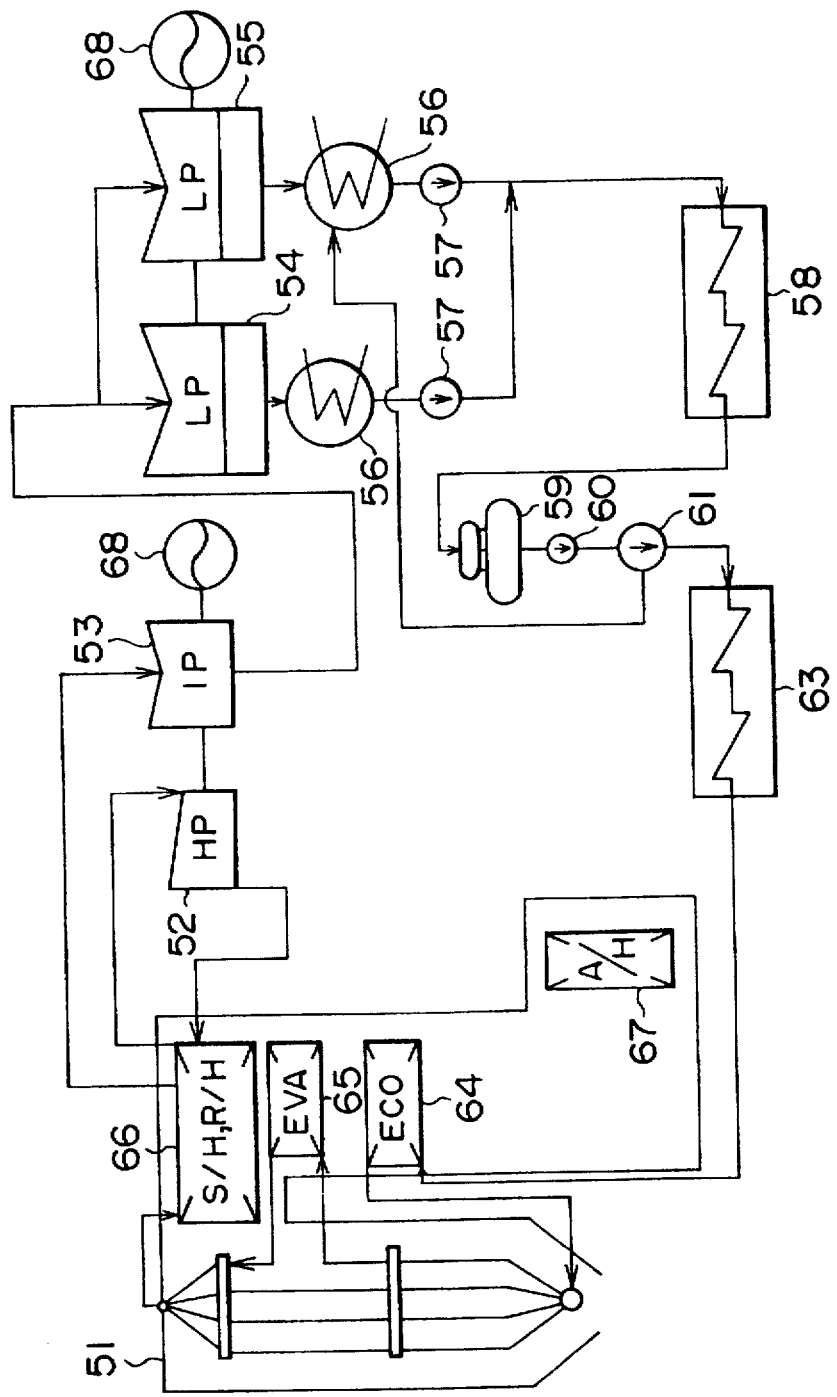
FIG. 4 is an arrangement diagram of a coal-fired power plant according to the present invention.

FIG. 4 is a diagram showing the typical plant layout of a coal-fired high-temperature high-pressure steam turbine plant.

The high-temperature high-pressure steam turbine plant in this embodiment is chiefly configured of a coal-fired boiler 51, a high-pressure turbine 52, an intermediate-pressure turbine 53, low-pressure turbines 54 and 55, steam condensers 56, condensate pumps 57, a low-pressure feed water heater system 58, a deaerator 59, a pressuring pump 60, a boiler feed pump 61 and a high-pressure feed water heater system 63. Herein, ultra-supercritical steam generated by the boiler 51 enters the high-pressure turbine 52 to generate power.

Thereafter, exhaust steam from the high-pressure turbine 52 is reheated by the boiler 51, and the resulting steam enters the intermediate-pressure turbine 53 to generate power again. Exhaust steam from the intermediate-pressure turbine 53 enters the low-pressure turbines 54 and 55 to generate power, and it is thereafter condensed by the condensers 56. The resulting condensate is sent to the low-pressure feed water heater system 58 and deaerator 59 by the condensate pumps 57. Feed water deaerated by the deaerator 59 is sent by the pressurizing pump 60 and boiler feed pump 61 to the high-pressure feed water heater system 63, in which the water is heated and from which it is returned to the boiler 51.

Here in the boiler 51, the feed water is turned into high temperature and high pressure steam by passing through an economizer 64, a vaporizer 65 and a superheater 66. Meantime, the combustion gas of the boiler 51 having heated the steam comes out of the economizer 64, and it thereafter enters an air heater 67 to heat air. In the illustrated plant, the boiler feed pump 61 is driven by a boiler feed pump driving turbine which is operated by steam extracted from the intermediate-pressure turbine 53.

In the high-temperature high-pressure steam turbine plant thus constructed, the temperature of the feed water having emerged from the high-pressure feed water heater system 63 is much higher than a feed water temperature in the prior-art thermal power plant, and hence, the temperature of the combustion gas having emerged from the economizer 64 disposed in the boiler 51 becomes much higher than in the prior-art boiler as an inevitable consequence. Therefore, heat is recovered from the exhaust gas of the boiler 51 so as to prevent the gas temperature from lowering.

Numerals 68 in FIG. 4 indicate generators which are respectively joined to the HP-IP connection and the tandem LP connection.

By the way, apart from this embodiment, it is possible to similarly construct a tandem compound type power plant in which the same high-pressure turbine, intermediate-pressure turbine and one or two low-pressure turbines as described above are joined in tandem so as to rotate a single generator for power generation. In the generator whose output power is in the 1050 (MW) class as in this embodiment, a shaft of higher strength is employed for the generator. Especially, the generator shaft should preferably be made of steel of fully-tempered bainitic structure which contains 0.15–0.30 (%) of C, 0.1–0.3 (%) of Si, at most 0.5 (%) of Mn, 3.25–4.5 (%) of Ni, 2.05–3.0 (%) of Cr, 0.25–0.60 (%) of Mo and 0.05–0.20 (%) of V, and which has a room-temperature tensile strength of 93 (kg/mm$^2$) or above, particularly 100 (kg/mm$^2$) or above, and a 50-% FATT (Fracture Appearance Transition Temperature) of 0 (°C.) or below, particularly –20 (°C.) or below. The steel should preferably be such that a magnetizing force at 21.2 (kG) is at most 985 (AT/cm), that impurities P, S, Sn, Sb and As contained is at the total amount of most 0.025 (%), and that a ratio Ni/Cr is at most 2.0.

Figure 5:
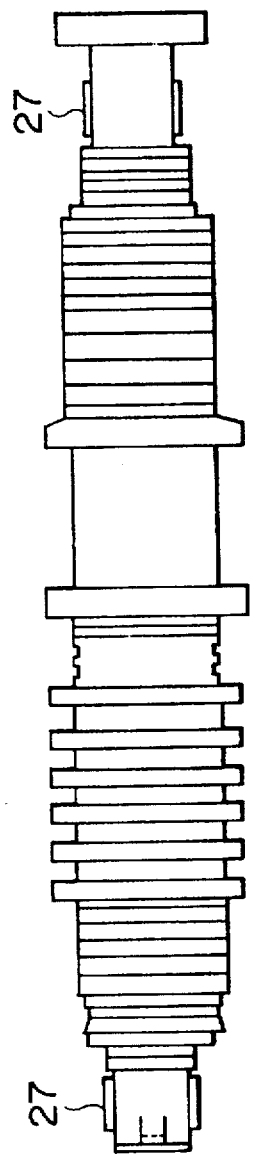
FIG. 5 is a sectional-view of a rotor shaft for the high-pressure steam turbine according to the present invention.
Figure 6:
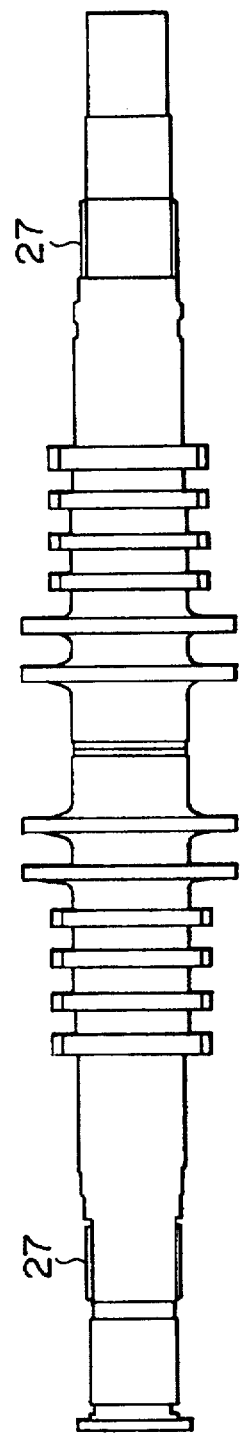
FIG. 6 is a sectional view of a rotor shaft for the intermediate-pressure steam turbine according to the present invention.

FIGS. 5 and 6 are front views showing examples of the high-pressure and intermediate-pressure turbine rotor shafts, respectively. The exemplified high-pressure turbine shaft has a construction which consists of a multistage side and a single-stage side, and in which blades totaling eight stages are assembled on both sides so as to laterally center on the first-stage blade of the multistage side. The exemplified intermediate-pressure turbine shaft has a construction in which multistage blades are assembled in a bilaterally symmetric arrangement so as to total six stages on each side and to be substantially bounded by the laterally central part of this shaft. Although the rotor shaft for each low-pressure turbine is not specifically exemplified, the rotor shaft of any of the high-pressure, intermediate-pressure and low-pressure turbines is formed with a center hole, through which the presence of defects is examined by a ultrasonic test, a visual test and a fluorescent penetrant inspection. Incidentally, numerals 27 in each of FIGS. 5 and 6 denote the journal parts of the corresponding rotor shaft.

Table 3 in FIG. 14 indicates the chemical constituents (weight-%) which were used for the principal components of the high-pressure turbine, intermediate-pressure turbine and low-pressure turbines in an example of this embodiment. In this example, all the high-temperature parts of the high-pressure and intermediate-pressure turbines were made of the steel materials of ferritic crystalline structure which had a coefficient of thermal expansion of 12×10$^{-6}$ (/°C.), so that no problems ascribable to discrepancy in the coefficients of thermal expansion occurred.

Regarding each of the rotors of the high-pressure and intermediate-pressure portions, an electrode was prepared in such a way that the heat-resisting cast steel mentioned in Table 3 was melted in an amount of 30 (tons) by an electric furnace, that the molten steel was subjected to carbon vacuum deoxidation and then poured into a metal mold, and that the molded steel was forged. Further, the electrode was subjected to electroslag remelting so as to melt from the upper part of the cast steel to the lower part thereof, and the resulting steel was forged into a rotor shape having a diameter of 1050 (mm) and a length of 3700 (mm). The forging was carried out at temperatures of at most 1150 (°C.) in order to prevent any forging cracks. Besides, after the forged steel was annealed, it was heated to 1050 (°C.) and was subjected to water spray quenching. Subsequently, the resulting steel was tempered twice at temperatures of 570 (°C.) and 690 (°C.), and it was machined into the shape shown in FIG. 5 or FIG. 6. In this example, the upper part side of the electroslag ingot was used as the first-stage blade side of the rotor shaft, and the lower part side as used as the final-stage blade side.

Regarding the blades and nozzles of the high-pressure portion and intermediate-pressure portion, the heat-resisting steel materials also mentioned in Table 3 of FIG. 14 were melted by a vacuum arc furnace, and they were forged and molded into the shapes of blade and nozzle blanks each having a width of 150 (mm), a height of 50 (mm) and a length of 1000 (mm). The forging was carried out at temperatures of at most 1150 (°C.) in order to prevent any forging cracks. Besides, the forged steel was heated to 1050 (°C.), subjected to oil quenching and tempered at 690 (°C.). Subsequently, the resulting steel was machined into the predetermined shapes.

Regarding the inner casings of the high-pressure portion and intermediate-pressure portion, the casing of each main-steam stop valve and the casing of each steam control valve, the heat-resisting cast steel materials mentioned in Table 3 were melted by an electric furnace and then refined by a ladle. The resulting materials were thereafter poured into sand molds. The cast steel, which did not suffer any casting defects such as shrinkage holes, could be obtained by sufficiently refining and deoxidizing the materials before the pouring. The weldability of each of the casing materials was evaluated in conformity with "JIS Z3158". A preheating temperature, an inter-pass temperature and a post-heating starting temperature were set at 200 (°C.), and a post-heating treatment was conducted at 400 (°C.) for 30 (minutes). No welding cracks were noted in either of the materials of the present invention, and the weldability was good.

Table 4 shown in FIG. 15 indicates the heat treatment conditions of the ferritic steel materials listed in Table 3 of FIG. 14, and the mechanical properties of the principal members of the high-temperature steam turbines made of the materials as tested by cutting these members.

From results of the tests of the central parts of the rotor shafts, it has been verified that the special qualities (625-°C. $10^5$-h strength$\geq$13 kgf/mm$^2$, and 20-°C. absorbed impact energy$\geq$1.5 kg-m) required of the high-pressure and intermediate-pressure turbine rotors can be satisfactorily met. Thus, it has been proved that the steam turbine rotors usable in steam of 620 (°C.) or above can be manufactured.

Besides, as the results of the property tests of the blades, it has been verified that the special quality (625-°C. $10^5$-h strength$\geq$15 kgf/mm$^2$) required of the first-stage blades of the high-pressure and intermediate-pressure turbines can be satisfactorily met. Thus, it has been proved that the steam turbine blades usable in steam of 620 (°C.) or above can be manufactured.

Further, as the results of the property tests of the casings, it has been verified that the special qualities (625-°C. $10^5$-h strength$\geq$10 kgf/mm$^2$, and 20-°C. absorbed impact energy$\geq$1 kg-m) required of the high-pressure and intermediate-pressure turbine casings can be satisfactorily met, and that weld metal materials can be deposited to the casings. Thus, it has been proved that the steam turbine casings usable in steam of 620 (°C.) or above can be manufactured.

Figure 7:
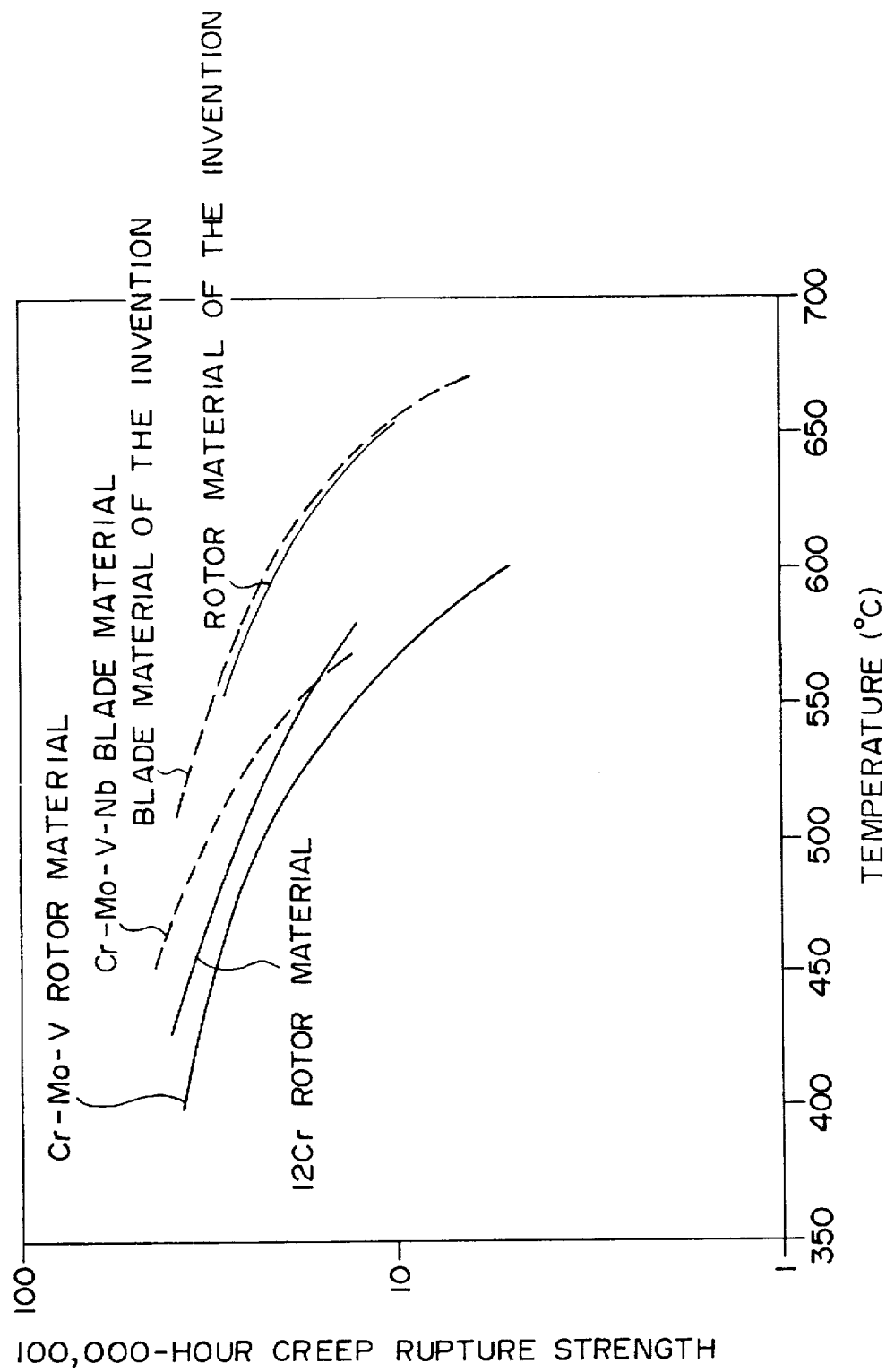
FIG. 7 is a graph showing the creep rupture strengths of rotor shaft and blade materials.

FIG. 7 is a graph showing the relationships between the $10^5$-h creep rupture strength and temperature for different rotor shaft materials. It has been found that the materials according to the present invention satisfy the requirements, which the $10^5$-h creep rupture strength is equal to or stronger than 13 kg/mm$^2$, at 610–640 (°C.). Incidentally, the 12Cr rotor material is the prior-art material which contains no B, W or Co.

In an example of this embodiment, bearing characteristics were improved in such a way that Cr—Mo low-alloy steel was deposited on each journal portion of the rotor shaft by buildup welding. The buildup welding was carried out as stated below.

Welding rods employed in the buildup welding were shielded-arc ones having diameters of 4.0 (mm). Table 5 shown in FIG. 16 indicates the chemical constituents (weight-%) of deposited metals which were formed by the welding operations with the shielded-arc welding rods. The constituents of the deposited metals were substantially the same as those of the corresponding weld metals (which shall be called the "welding rods A–D" below).

The conditions of the buildup welding were a welding current of 170 (A), a voltage of 24 (V) and a rate of 26 (cm/min).

Eight layers were welded onto the surface of the parent metal described before, as the buildup welding by combining the used welding rods A–D for the respective layers as listed in Table 6 of FIG. 17. The thickness of each layer was 3–4 (mm), the total thickness of the eight layers forming each of samples Nos. 1–3 was about 28 (mm), and the surface of each sample was ground to about 5 (mm).

As the conditions of execution of the welding operations, a preheating temperature, an inter-pass temperature and a stress-relief-annealing (SR) starting temperature were 250–350 (°C.), and the SR was conducted by holding the deposited layers at 630 (°C.) for 36 (hours).

All the samples Nos. 1–3 conformed to the present invention, and the chemical constituents of the fifth layer et seq. in each sample were C or D mentioned in Table 5 of FIG. 16.

In order to confirm the quality of such a welding zone, buildup welding was similarly conducted on a flat member, and the resulting flat member was subjected to a side-bend test of 160°. All this time, no cracks were noted in the welding zone.

Further, when the bearings were subjected to a slide test on the basis of the revolutions of the rotor shafts in the present invention, and none of them were not adversely affected. The oxidation resistances of the bearings were also excellent.

Apart from this embodiment, it is possible to similarly construct a tandem type power plant in which the high-pressure turbine, intermediate-pressure turbine and one or two low-pressure turbines are joined in tandem so as to rotate a single generator at 3600 (r/min).

(Embodiment 2)

Each of a number of alloys, having chemical constituents listed in Table 7 of FIG. 18, was cast into an ingot of 10 (kg) by vacuum induction melting, and the ingot was forged into a rod of 30 (mm-square). Regarding the rotor shaft of a large-sized steam turbine, each of the alloys was quenched under the conditions of 1050 (°C.)×5 (hours) and 100 (°C/h) cooling and was subjected to primary tempering of 570 (°C.)×20 (hours) and the secondary tempering of 690 (°C.) ×20 (hours), by simulating the central part of the rotor shaft. On the other hand, regarding the blade of the turbine, each alloy was quenched under the condition of 1100 (°C.)×1 (hour) and was tempered under the condition of 750 (°C.)×1 (hour). Thereafter, the creep rupture tests of such alloys were executed under the conditions of 625 (°C.) and 30 (kgf/mm$^2$). The results obtained are also listed in Table 7 of FIG. 18.

It is seen from Table 7 that the alloys No. 1–No. 9 according to the present invention have a much longer creep rupture lifetime than the comparative alloy No. 10.

Incidentally, the comparative alloy No. 10 does not contain Co unlike the alloys of the present invention.

Figure 8:
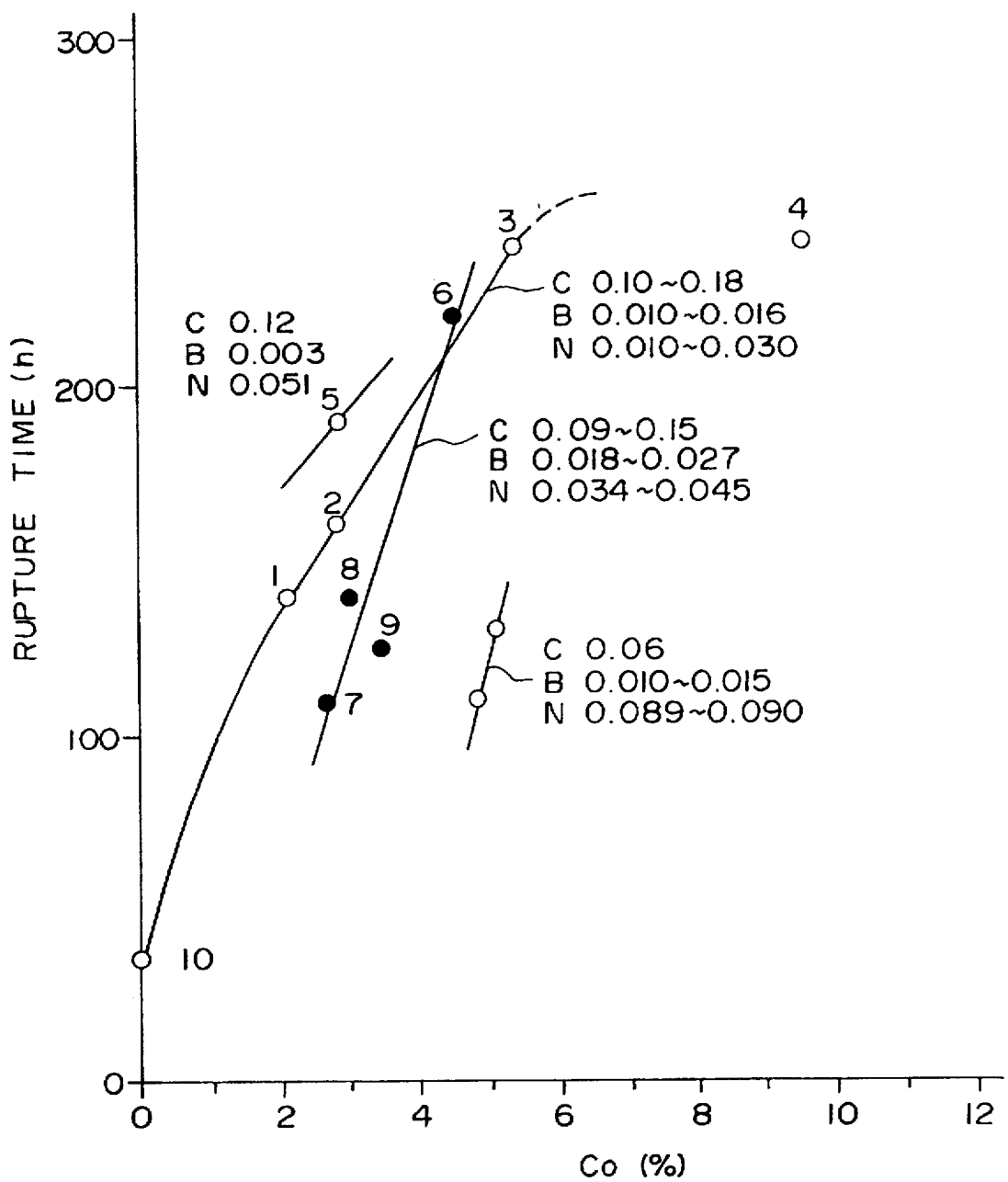
FIG. 8 is a graph showing the relationships between the creep rupture time periods and Co contents of alloys.
Figure 9:
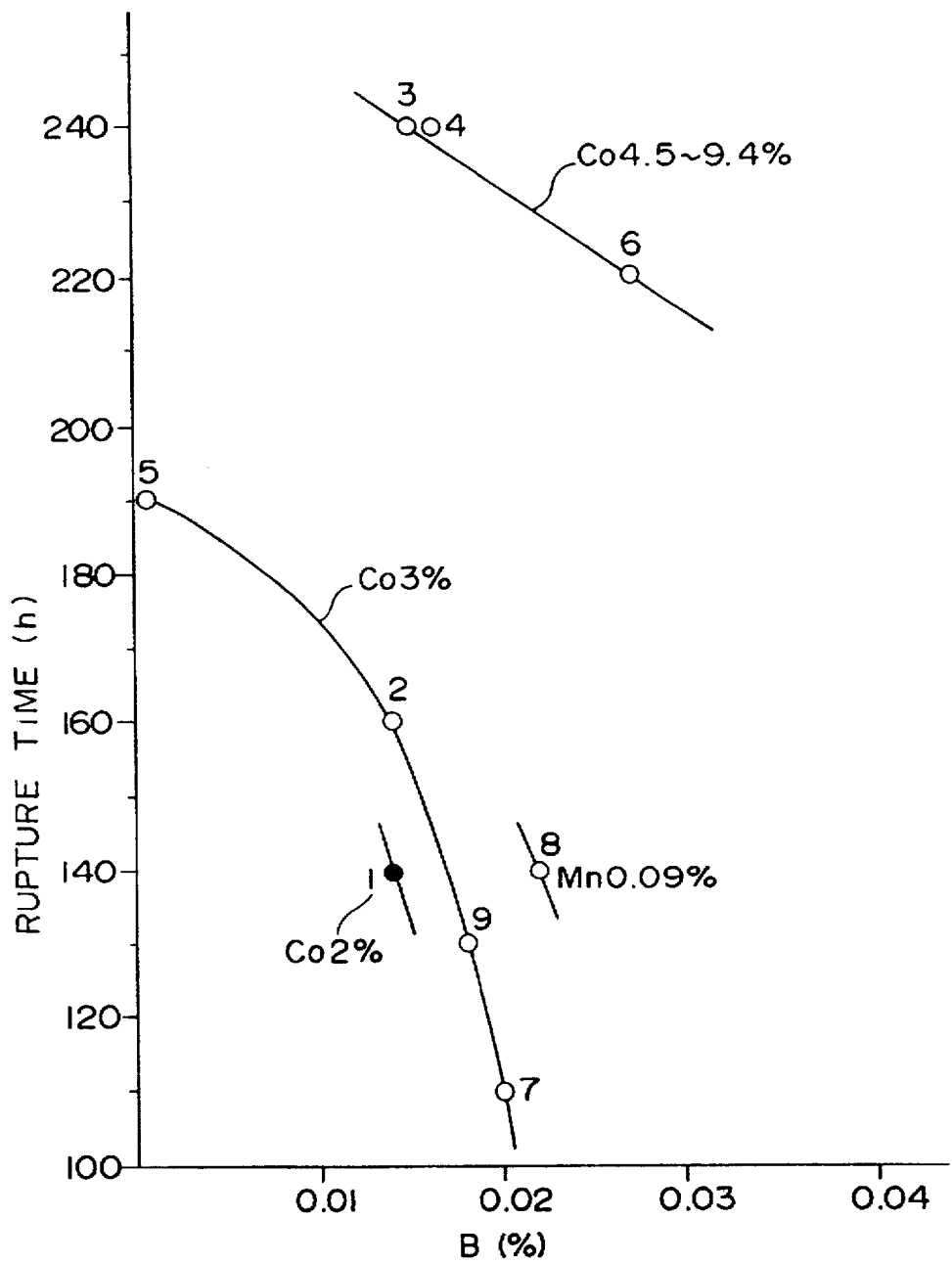
FIG. 9 is a graph showing the relationships between the creep rupture time periods and B contents of the alloys.

FIGS. 8 and 9 are graphs showing those influences of the Co content and B content of the alloys (listed in Table 7 of FIG. 18) which are respectively exerted on the creep rupture strength.

As shown in FIG. 8, the creep rupture time period of the alloy becomes longer with increase in the Co content. However, the increase of the Co content by a large amount is unfavorable for the reason that the alloy is liable to become brittle when heated at 600–660 (°C.). In order to enhance both the strength and toughness of the alloy, therefore, the Co content should preferably be 2–5 (%) for 620–630 (°C.) and 5.5–8 (%) for 630–660 (°C.).

As shown in FIG. 9, the strength of the alloy is prone to lower with increase in the B content. It is understood that the alloy exhibits a superior strength when the B content is 0.03 (%) or below. The strength is increased by setting the B content to 0.001–0.01 (%) and the Co content to 2–4 (%) in a temperature range of 620–630 (°C.), and by increasing the B content to 0.01–0.03 (%) and the Co content to 5–7.5 (%) on a higher temperature side of 630–660 (°C.).

It has been revealed that the alloy is strengthened more by a lower N content at the temperatures exceeding 600 (°C.) in this embodiment. This is also apparent from the fact that sample No. 2 in Table 7 of FIG. 18 exhibits a higher strength than sample No. 8 having a higher N content. The N content of the alloy should preferably be 0.01–0.04 (%). Since the constituent N was hardly contained by the vacuum melting, the parent alloy was doped with the element N.

It is seen from FIG. 7 concerning Embodiment 1 that all the alloys according to the present invention as listed in Table 7 exhibit high strengths. The rotor material indicated in Embodiment 1 corresponds to the alloy of the sample No. 2 in this embodiment.

As shown in FIG. 9, the sample No. 8 having a low Mn content of 0.09 (%) exhibits a higher strength, subject to equal Co contents. As is also apparent from this fact, the Mn content of the alloy should preferably be set at 0.03–0.20 (%) in order to attain a higher strength.

(Embodiment 3)

Table 8 shown in FIG. 19 indicates chemical constituents (weight-%) which concern the inner casing materials of the present invention. With the thick part of a large-sized casing assumed, the ingot of each of the listed samples was prepared in such a way that each alloy was melted in an amount of 200 (kg) by a high-frequency induction furnace, and that the molten alloy was poured into a sand mold having a maximum thickness of 200 (mm), a width of 380 (mm) and a height of 440 (mm). The samples Nos. 3–7 are materials according to the present invention, whereas the samples Nos. 1 and 2 are materials of the prior art. The materials of the samples Nos. 1 and 2 are Cr—Mo—V cast steel and 11Cr—1Mo—V—Nb—N cast steel respectively which are currently used in turbines. After having been annealed by furnace cooling of 1050 (°C.)×8 (h), the samples were heat-treated (normalized and tempered) under the following conditions, assuming the thick part of the casing of the large-sized steam turbine:

Sample No. 1:
Air cooling of 1050 (°C.)×8 (h)
Air cooling of 710 (°C.)×7 (h)
Air cooling of 710 (°C.)×7 (h)

Samples No. 2–No. 7:
Air cooling of 1050 (°C.)×8 (h)
Air cooling of 710 (°C.)×7 (h)
Air cooling of 710 (°C.)×7 (h)

The weldability of each of the samples was evaluated in conformity with "JIS Z3158". A preheating temperature, an inter-pass temperature and a post-heating starting temperature were set at 150 (°C.), and a post-heating treatment was conducted at 400 (°C.) for 30 (minutes)

Table 9 shown in FIG. 20 indicates the test results of the samples Nos. 1–7 listed in Table 8 of FIG. 19, concerning tensile characteristics at room temperature, V-notch Charpy impact absorption energy at 20 (°C.), a 650-°C. $10^5$-h creep rupture strength, and a welding crack.

The creep rupture strength and the absorbed impact energy of each of the materials of the present invention (samples Nos. 3, 4, 6 and 7) doped with appropriate amounts of B, Mo and W, fully satisfy the special qualities (625-°C. $10^5$-h strength$\geq$8 kgf/mm$^2$, and 20-°C. absorbed impact energy$\geq$1 kg-m) required of the high-temperature high-pressure turbine casing. Especially, the samples Nos. 3, 6 and 7 exhibit high strengths exceeding 9 (kgf/mm$^2$). Moreover, none of the materials of the present invention (except the sample No. 3) suffer from welding cracks and all have good weldability. As the result of a test concerning the relationship between the B content and the welding crack of the alloy, when the B content exceeded 0.0035 (%), the welding crack appeared. The alloy of the sample No. 3 was considered to be somewhat cracked. Regarding the influences of the constituent Mo on the mechanical properties, the alloy whose Mo content was as high as 1.18 (%) had a high creep rupture strength, but it exhibited a small impact energy value and could not meet the required toughness. On the other hand, the alloy whose Mo content was 0.11 (%) had a high toughness, but it exhibited a low creep rupture strength and could not meet the required strength.

As the result of the investigation of the influences of the constituent W on the mechanical properties, when the W content exceeds 1.1 (%), the creep rupture strength becomes remarkably high, but when it exceeds 2 (%), the room-temperature absorbed impact energy becomes low. Especially, the Ni/W ratio of the alloy is controlled to 0.25–0.75, thereby obtaining the casing material of the heat-resisting cast steel which meets a 625-°C. $10^5$-h creep rupture strength of at least 9 (kgf/mm$^2$) and a room-temperature absorbed impact energy of at least 1 (kgf-m) that are required of the high-pressure and intermediate-pressure inner casings, and main-steam stop valve and control valve casings of the high-temperature high-pressure turbine under a pressure of at least 250 (kgf/cm$^2$) at a temperature of 621 (°C.). Especially, the W content and the Ni/W ratio are respectively controlled to 1.2–2 (%) and 0.25–0.75, thereby obtaining the excellent casing material of the heat-resisting cast steel which meets a 625-°C. $10^5$-h creep rupture strength of at least 10 (kgf/mm$^2$) and a room-temperature absorbed impact energy of at least 2 (kgf-m).

Figure 10:
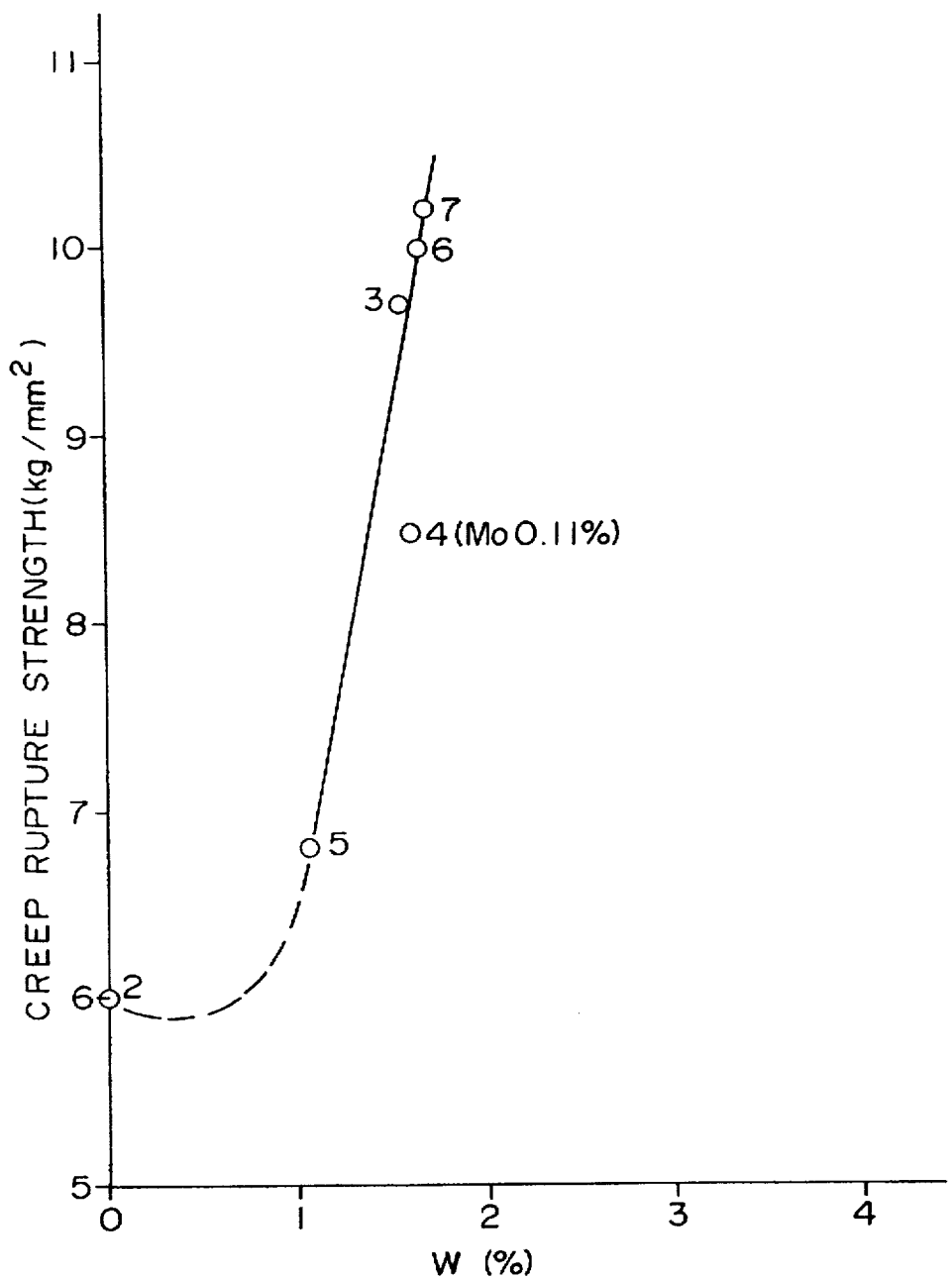
FIG. 10 is a graph showing the relationship between the creep rupture strengths and W contents of the alloys.

FIG. 10 is a graph showing the relationship between the W content and the creep rupture strength for the alloys explained above. As indicated in the figure, when the W content is at least 1.0 (%), the strength is remarkably increased, and a value of at least 8.0 (kg/mm$^2$) is attained, especially for a W content of at least 1.5 (%).

Figure 11:
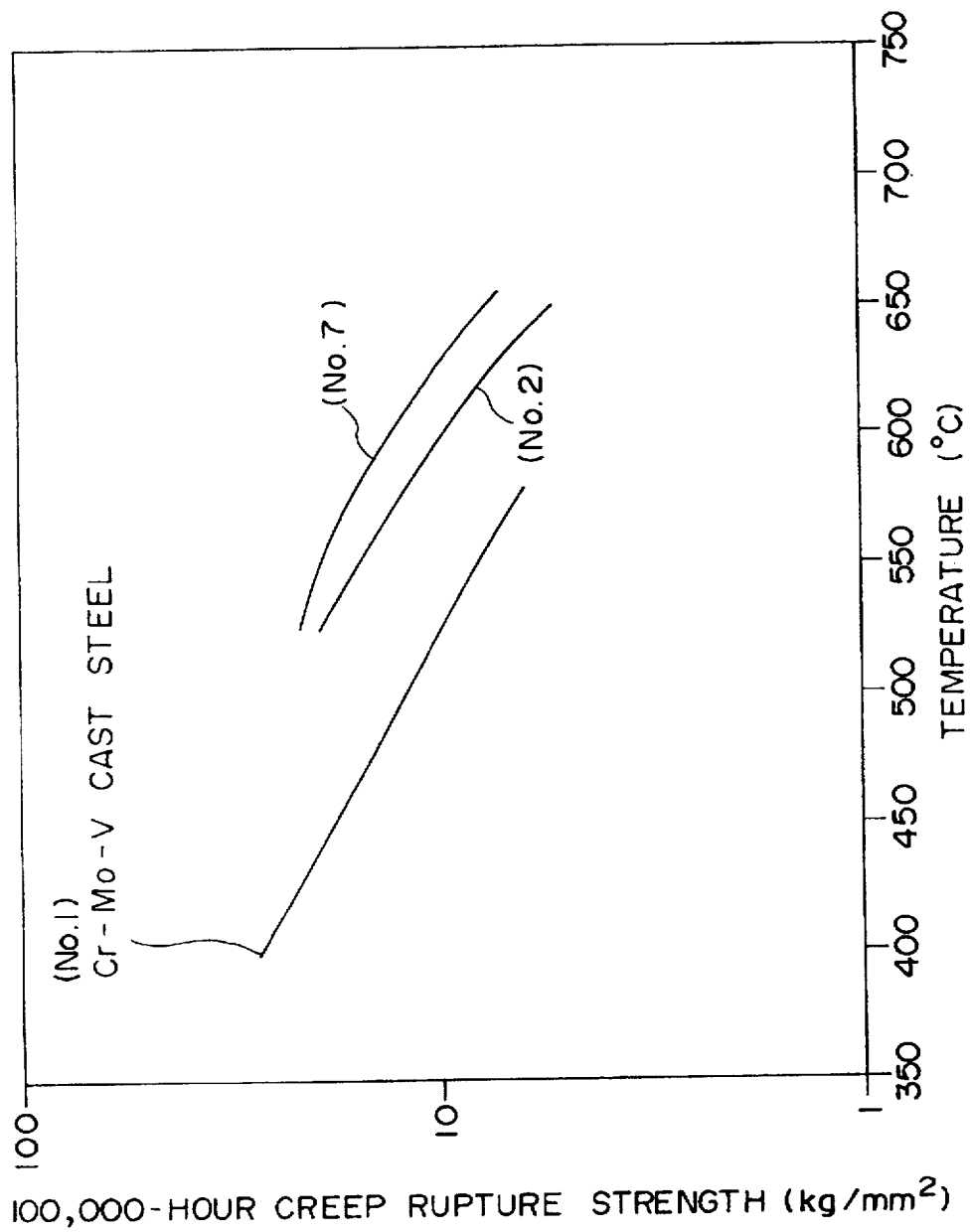
FIG. 11 is a graph showing the creep rupture strengths of casing materials.

FIG. 11 is a graph showing the relationship between the $10^5$-hour creep rupture strength and the rupture temperature for the alloys explained above. The alloy of the sample No. 7 in the present invention satisfactorily meets the required strength at temperatures of, at most, 640 (°C.).

In an example, alloying raw materials to be brought into the desired composition of the heat-resisting cast steel in the present invention were melted in an amount of 1 (ton) by an electric furnace and then refined by a ladle, and the resulting raw materials were thereafter poured into a sand mold. Thus, the inner casing for the high-pressure portion or intermediate-pressure portion as described in Embodiment 1 was obtained.

After having been annealed by furnace cooling of 1050 (°C.)×8 (h), the cast steel stated above was normalized by air-blast quenching of 1050 (°C.)×8 (h) and was tempered twice by furnace cooling of 730 (°C.)×8 (h). The casing which was manufactured by way of trial and which had a fully-tempered martensitic structure, was cut and investigated. As a result, it was verified that the manufactured casing fully satisfies the special qualities (625-°C. $10^5$-h strength≧9 kgf/mm², and 20-°C. absorbed impact energy≧1 kg-m) required of the casing of the high-temperature high-pressure turbine of 250 (atm.) and 625 (°C.), and that it can be subjected to welding.

(Embodiment 4)

This embodiment sets the steam temperature of a high-pressure steam turbine and an intermediate-pressure steam turbine at 649 (°C.) in place of 625 (°C.) in Embodiment 1, and the construction and size thereof are obtained by substantially the same design as in Embodiment 1. Different here from Embodiment 1 are the rotor shafts, first-stage moving blades, first-stage fixed blades and inner casings of the high-pressure and intermediate-pressure steam turbines that come into direct contact with the steam of the above temperature. In the materials of these components except the inner casings, the B content and the Co content are respectively increased to 0.01–0.03 (%) and 5–7 (%) in the foregoing materials listed in Table 7 of FIG. 18. Further, as the material of the inner casings, the W content of the material in Embodiment 1 as indicated in Table 3 of FIG. 14 is increased to 2–3 (%), and Co is added 3 (%). In this way, required strengths are fulfilled, and the design in the prior art can be used very meritoriously. More specifically, in this embodiment, the design concept in the prior art as it is can be used in the point that all the structural materials to be exposed to the high temperature are formed of ferritic steel. By the way, since the second-stage moving blades and fixed blades of the high-pressure and intermediate-pressure steam turbines are subject to steam inlet temperatures of about 610 (°C.), the material used for the first stage in Embodiment 1 should preferably be employed for these components.

Further, the steam temperature of low-pressure steam turbines in this embodiment becomes about 405 (°C.) which is somewhat higher than about 380 (°C.) in Embodiment 1. However, since the material in Embodiment 1 has a satisfactorily high strength for the rotor shafts themselves of the low-pressure steam turbines, the same superclean material (high purity material) is employed.

Still further, although a turbine configuration in this embodiment is of the cross-compound type, the tandem type in which all the turbines are directly connected can also be realized at a rotational speed of 3600 (r.p.m.).

The present invention thus far described brings forth effects as stated below.

According to the present invention, it is possible to obtain heat-resisting martensitic cast steel the creep rupture strength and room-temperature toughness of which are high at 610–660 (°C.). Therefore, all principal members for ultra-supercritical pressure turbines at individual temperatures can be made of heat-resisting ferritic steel, the basic designs of prior-art steam turbines can be used as they are, and a thermal power plant of high reliability can be built.

Heretofore, an austenitic alloy has been inevitably used at such temperatures. It has therefore been impossible to manufacture a nondefective large-sized rotor, from the viewpoint of manufactural properties. In contrast, according to heat-resisting ferritic forged steel of the present invention, the nondefective large-sized rotor can be manufactured.

Moreover, the high-temperature steam turbine made entirely of the ferritic steel according to the present invention does not use the austenitic alloy which has a large coefficient of thermal expansion. Therefore, the steam turbine has such advantages as being rapidly started with ease and being less susceptible to thermal fatigue damage.

What is claimed is:

1. A steam-turbine power plant having a high-pressure turbine, an intermediate-pressure turbine and a low-pressure turbine, the improvement comprising:

steam inlet of each of the high-pressure and intermediate-pressure turbines leading to moving blades of a first stage included in each of said high-pressure and intermediate-pressure turbines being at a temperature of 610°–660° C.;

steam inlet of said low-pressure turbine leading to moving blades of a first stage included in said low-pressure turbine being at a temperature of 380°–475° C.;

a rotor shaft, said moving blades, fixed blades and a casing, which are included in each of said high-pressure and intermediate-pressure turbines and which are exposed to the temperature of said steam inlet of each of said high-pressure and intermediate-pressure turbines, being made of high-strength martensitic steel comprising 8–13 weight-% of Cr; and a final-stage blade portion of the moving blades in said low-pressure steam turbine having a length over 1016 mm and made of a Ti-based alloy.

2. A steam-turbine power plant comprising a high-pressure turbine, an intermediate-pressure turbine and a low-pressure turbine, wherein steam inlet of each of the high-pressure and intermediate-pressure turbines leading to moving blades of a first-stage included in each of said high-pressure and intermediate-pressure turbines is at a temperature of 610°–660° C., steam inlet of said low-pressure turbine leading to moving blades of a first-stage included in each of said low-pressure turbine is at a temperature of 380°–475° C., a rotor shaft of each of said high-pressure and intermediate-pressure turbines and, at least, said first-stage one of said moving blades of each of said high-pressure and intermediate-pressure turbines are made of martensitic steel comprising 8–13% of Cr, and said moving blades each have a final-stage including a blade portion having a length over 1016 mm and made of a Ti-based alloy.

3. A steam-turbine power plant having a high-pressure turbine and an intermediate-pressure turbine which are joined to each other, and two low-pressure turbines which are connected in tandem, the improvement comprising:

steam inlet of each of the high-pressure and intermediate-pressure turbines leading to moving blades of a first stage included in each of said high-pressure and intermediate-pressure turbines being at a temperature of 610°–660° C.;

steam inlet of said low-pressure turbine leading to moving blades of a first stage included in said low-pressure turbine being at a temperature of 380°–475° C.;

the first-stage moving blade of said high-pressure turbine, and that part of a rotor shaft of said high-pressure turbine on which said first-stage moving blade is assembled being held at metal temperatures which are not, at least, 40° C. lower than the temperature of said steam inlet of said high-pressure turbine leading to said first-stage moving blade;

the first-stage moving blade of said intermediate-pressure turbine, and that part of a rotor shaft of said intermediate-pressure turbine on which said first-stage moving blade are assembled being held at metal temperature which is not, at least, 75° C. lower than the temperature of said steam inlet of said intermediate-pressure turbine leading to said first-stage moving blade; and said rotor shaft of each of said high-pressure and intermediate-pressure turbines and, at least, said first-stage of one of said moving blades of each of said high-pressure and intermediate-pressure turbines being made of martensitic steel comprising 9.5–13 weight-% of Cr; and a final-stage blade portion of the moving blades in said low-pressure steam turbine having a length over 1016 mm and made of a Ti-based alloy.

4. A coal-fired power plant having a coal-fired boiler, steam turbines driven by steam developed by the boiler, and one or two generators driven by the steam turbines and capable of generating an output of at least 1000 MW, the improvement comprising:

a high-pressure turbine, an intermediate-pressure turbine which is joined to said high-pressure turbine, and two low-pressure turbines included in said steam turbines;

steam inlet of each of the high-pressure and intermediate-pressure turbines leading to moving blades of a first stage included in each of said high-pressure and intermediate-pressure turbines being at a temperature of 610°–660° C.; and steam inlet of said low-pressure turbine leading to moving blades of a first stage included in said low-pressure turbine being at a temperature of 380°–475° C., the steam being heated by a superheater of said boiler to a temperature of at least 3° C. higher than the temperature of said steam inlet of said high-pressure turbine leading to the first-stage moving blade thereof, whereupon the heated steam is caused to flow into said first-stage moving blade of said high-pressure turbine.

the steam coming out of said high-pressure turbine being heated by a reheater of said boiler to a temperature of at least 2° C. higher than the temperature of said steam inlet of said intermediate-pressure turbine leading to the first-stage moving blade thereof, whereupon the heated steam is caused to flow into said first-stage moving blade of said intermediate-pressure turbine.

the steam coming out of said intermediate-pressure turbine being heated by an economizer of said boiler to a temperature of at least 3° C. higher than the temperature of said steam inlet of said low-pressure turbine leading to the first-stage moving blade thereof, whereupon the heated steam is caused to flow into said first-stage moving blade of said low-pressure turbine, and a final-stage blade portion of the moving blades in said low-pressure steam turbine having a length over 1016 mm and made of a Ti-based alloy.

5. A low-pressure steam turbine comprising a rotor shaft, moving blades assembled on the rotor shaft, fixed blades for guiding inflow of steam to the moving blades, and an inner casing for holding the fixed blades, wherein said moving blades have a double-flow construction in which at least eight stages are included on each side in a lengthwise direction of said rotor shaft, in a bilaterally symmetric arrangement on both sides, and in which first stage of the arrangement is assembled on a central part of said rotor shaft in the lengthwise direction, said rotor shaft has a distance L of at least 7000 mm between centers of bearings in which it is journaled, and a minimum diameter D of at least 1150 mm at its parts which correspond to said fixed blades, a ratio L/D between the distance L and the diameter D being 5.4–6.3, and is made of Ni—Cr—Mo—V low-alloy steel comprising 1–2.5 wt % of Cr and 3.0–4.5 wt % of Ni, and said moving blades each have a final-stage including a blade portion having a length over 1016 mm and made of a Ti-based alloy.

6. A low-pressure steam turbine comprising a rotor shaft, moving blades assembled on the rotor shaft, fixed blades for guiding inflow of steam to the moving blades, and an inner casing for holding the fixed blades, wherein said moving blades have a double-flow construction in which at least 8 stages are included on each of two sides in an axial direction of said rotor shaft, in a bilaterally symmetric arrangement on both sides, diameters of the parts of said rotor shaft that correspond to said fixed blades are smaller than the diameters of the parts of said rotor shaft that correspond to the assembled moving blades, widths of the rotor shaft parts corresponding to said fixed blades, in the axial direction of said rotor shaft, are stepwise larger on an upstream side of the steam flow than on a downstream side thereof at, at least, three of said stages;

a width between a final stage of said moving blades and a stage thereof directly preceding the final stage is 1.5–2.5 times as large as the width between a first stage and a second stage of said moving blades, widths of the rotor shaft parts corresponding to said assembled moving blades, in said axial direction of said rotor shaft, are stepwise larger on the downstream side of said steam flow than on the upstream side thereof at, at least, 3 of said stages, and an axial width of said final stage of said moving blades is 2–3 times as large as an axial width of said first stage of said moving blades, and said moving blades each have a final-stage including a blade portion having a length over 1016 mm and made of a Ti-based alloy.

7. A low-pressure steam turbine comprising a rotor shaft, moving blades assembled on the rotor shaft, fixed blades for guiding inflow of steam to the moving blades, and an inner casing for holding the fixed blades, wherein said moving blades have a double-flow construction in which at least eight stages are included on each of two sides in a lengthwise direction of said rotor shaft, in a bilaterally symmetric arrangement on both sides, and blade portions thereof have lengths within a range of 90–1300 mm in a region from an upstream side of the steam flow to a downstream side thereof, diameters of parts of said rotor shaft on which said moving blades are assembled are larger than diameters of parts of said rotor shaft corresponding to the said fixed blades, widths of moving-blade assembling parts of said rotor shaft in an axial direction of said rotor shaft are larger on the downstream side than on the upstream side, and their ratios to the length of said blade portions decrease from said upstream side toward said downstream side within a range of 0.15–1.0, and said moving blades each have a final-stage including a blade portion having a length over 1016 mm and made of a Ti-based alloy.

8. A low-pressure steam turbine comprising a rotor shaft, moving blades assembled on the rotor shaft, fixed blades for guiding inflow of steam to the moving blades, and an inner casing for holding the fixed blades, wherein said moving blades have a double-flow construction in which at least eight stages are included on each of two sides in a lengthwise direction of said rotor shaft, in a bilaterally symmetric arrangement on both sides, and blade portions thereof have lengths within a range of 90–1300 mm in a region from an upstream side of the steam flow to a downstream side thereof, lengths of said blade portions of the respectively adjacent stages are larger on the downstream side than on the upstream side, and their ratios increase gradually toward said downstream side within a range of 1.2–1.7, and said moving blades each have a final-stage including a blade portion having a length over 1016 mm and made of a Ti-based alloy.

9. A low-pressure steam turbine comprising a rotor shaft, moving blades assembled on the rotor shaft, fixed blades for guiding inflow of steam to the moving blades, and an inner casing for holding the fixed blades, wherein said moving blades have a double-flow construction in which at least eight stages are included on each of two sides in a lengthwise direction of said rotor shaft, in a bilaterally symmetric arrangement on both sides, and blade portions thereof have lengths within a range of 90–1300 mm in a region from an upstream side of the steam flow to a downstream side thereof, widths of parts of said rotor shaft corresponding to said fixed blades, taken in an axial direction of said rotor shaft, are larger on the downstream side than on the upstream side, and their ratios to the lengths of blade portions of the respectively adjacent moving blades on said downstream side decrease stepwise toward said downstream side within a range of 0.2–1.4, and said moving blades each have a final-stage including a blade portion having a length over 1016 mm and made of a Ti-based alloy.

10. A low-pressure steam turbine comprising a rotor shaft, moving blades assembled on the rotor shaft, fixed blades for guiding inflow of steam to the moving blades, and an inner casing for holding the fixed blades, wherein steam inlet of said low-pressure turbine leading to a first-stage one of said moving blades is at a temperature of 380°–450° C., said rotor shaft is made of low-steel comprising 0.2–0.3 % of C, at most 0.05% of Si, at most 0.1% of Mn, 3.0–4.5% of Ni, 1.25–2.25% of Cr, 0.07–0.20% of Mo, 0.07–0.2% of V and at least 92.5% of Fe, the percentages being given in terms of weight, and said moving blades each have a final-stage including a blade portion having a length over 1016 mm and made of a Ti-based alloy.

11. A steam-turbine power plant according to claim 2 wherein said high-pressure turbine has moving blades arranged to have at least seven stages, and each blade portion of the moving blades has a length within a range of 35–210 mm in a region from an upstream side of the steam flow to a downstream side thereof, said intermediate-pressure turbine has moving blades arranged to have a double-flow construction in which at least six stages are bilateral-symmetrically included on each of two sides, and each blade portion of the moving blades has a length within a range of 100–300 mm in a region from an upstream side of the steam flow to a downstream side thereof, and said low-pressure turbine has moving blades arranged to have a double-flow construction in which at least eight stages are bilateral-symmetrically included on each of two sides, and each blade portion of the moving blades has a length within a range of 90–1300 mm in a region from an upstream side of the steam flow to a downstream side thereof.

12. A coal-fired power plant comprising a coal-fired boiler, steam turbines driven by steam developed by the boiler, and one or two generators driven by the steam turbines and capable of generating an output of at least 1000 MW, wherein said steam turbines include a high-pressure turbine, an intermediate-pressure turbine joined to said high-pressure turbine, and two low-pressure turbines, steam inlet of each of said high-pressure and intermediate-pressure turbines leading to moving blades of a first-stage included in each of the high-pressure and intermediate-pressure turbines is at a temperature of 610°–660° C., steam inlet said low-pressure turbine leading to moving blades of a first-stage included in each of the low-pressure turbine is at a temperature of 380°–475° C., and said moving blades each have a final-stage including a blade portion having a length over 1016 mm and made of a Ti-based alloy.

13. A steam-turbine power plant according to claim 2, wherein a rotor shaft and, at least, the first-stage of the moving blades of each of said high-pressure and intermediate-pressure are made of high-strength martensitic steel of fully-tempered martensitic structure which exhibits a $10^5$-hour creep rupture strength of at least 13 kg/mm$^2$ at the rotor shaft and at least 15 kg/mm$^2$ at the moving blades at a temperature corresponding to the inflowing steam temperature of the first-stage moving blade, and which comprises 9–13 wt % of Cr.

14. A steam-turbine power plant according to claim 2, wherein a rotor shaft and, at least, the first-stage of the moving blades of each of said high-pressure and intermediate-pressure are made of high-strength martensitic steel comprising 0.05–0.20% of C, at most 0.15% of Si, 0.03–1.5% of Mn, 9.5–13% of Cr, 0.05–1.0% of Ni, 0.05–0.35% of V, 0.01–0.20% of Nb, 0.01–0.06% of N, 0.05–0.5% of Mo, 1.0–3.5% of W, 2–10% of Co, 0.0005–0.03% of B, and at least 78% of Fe, the percentages being given in terms of weight.

15. A steam-turbine power plant according to claim 2, wherein a rotor shaft and, at least, the first-stage of the moving blades of each of each of said high-pressure and intermediate-pressure are made of high-strength martensitic steel of fully-tempered martensitic structure exhibiting a $10^5$-hour creep rupture strength of at least 13 kg /mm$^2$ at the rotor shaft and at least 15 kg/mm$^2$ at the moving blades at a temperature corresponding to the inflowing steam temperature of the first-stage moving blade, and comprising 9–13wt % of Cr, and said Ti-based alloy comprises 5–8% of Al and 3–6% of V, the percentages being given in terms of weight.

16. A steam-turbine power plant according to claim 2, wherein a rotor shaft and, at least, the first-stage of the moving blades of each of said high-pressure and intermediate-pressure are made of high-strength martensitic steel comprising 0.05–0.20% of C, at most 0.15% of Si, 0.03–1.5% of Mn, 9.5–13% of Cr, 0.05–1.0% of Ni, 0.05–0.35% of V, 0.01–0.20% of Nb, 0.01–0.06% of N, 0.05–0.5% of Mo, 1.0–3.5% of W, 2–10% of Co, 0.0005–0.03% of B, and at least 78% of Fe, the percentages being given in terms of weight, and said Ti-based alloy comprising 5–8% of Al and 3–6% of V, the percentages being given in terms of weight.

* * * * *